(12) United States Patent
Pertsel

(10) Patent No.: US 11,655,893 B1
(45) Date of Patent: May 23, 2023

(54) EFFICIENT AUTOMATIC GEAR SHIFT USING COMPUTER VISION

(71) Applicant: Ambarella International LP, Santa Clara, CA (US)

(72) Inventor: Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 35 days.

(21) Appl. No.: 17/509,666

(22) Filed: Oct. 25, 2021

(51) Int. Cl.
*F16H 61/02* (2006.01)
*G06T 7/20* (2017.01)
(Continued)

(52) U.S. Cl.
CPC ......... *F16H 61/0204* (2013.01); *F16H 59/14* (2013.01); *F16H 59/44* (2013.01); *F16H 59/66* (2013.01); *F16H 59/74* (2013.01); *G06F 18/25* (2023.01); *G06T 7/20* (2013.01); *G06V 10/95* (2022.01); *G06V 20/582* (2022.01); *G06V 20/584* (2022.01); *G06V 20/588* (2022.01); *B60L 15/2054* (2013.01); *B60L 2240/12* (2013.01); *B60L 2240/421* (2013.01); *B60L 2240/423* (2013.01); *B60L 2240/647* (2013.01); *B60L 2240/68* (2013.01); *F16H 2059/366* (2013.01); *F16H 2059/663* (2013.01); *F16H 2061/161* (2013.01); *G06T 2207/30252* (2013.01); *G06V 2201/08* (2022.01)

(58) Field of Classification Search
CPC ...... F16H 61/0204; F16H 59/14; F16H 59/44; F16H 59/66; F16H 59/74; F16H 2059/366; F16H 2059/663; F16H 2061/161; G06F 18/25; G06T 7/20; G06T 2207/30252; G06V 10/95; G06V 20/582; G06V 20/584; G06V 20/588; G06V 2201/08; B60L 15/2054; B60L 2240/12; B60L 2240/421; B60L 2240/423; B60L 2240/647; B60L 2240/68

See application file for complete search history.

(56) References Cited

U.S. PATENT DOCUMENTS 8,880,291 B2 * 11/2014 Hampiholi .............. B60R 25/25
701/1
8,977,008 B2 * 3/2015 Camilleri ............... H04N 7/188
348/904

(Continued)

*Primary Examiner* — Justin Holmes
(74) *Attorney, Agent, or Firm* — Christopher P. Maiorana, PC

(57) ABSTRACT

An apparatus comprising an interface and a processor. The interface may be configured to receive pixel data of an exterior environment of a vehicle. The processor may be configured to process the pixel data arranged as video frames, perform computer vision operations to detect objects in the video frames, extract characteristics about the objects detected, determine driving conditions in response to an analysis of the characteristics and generate a control signal. The control signal may be configured to perform a gear shift. The driving conditions may be used to predict a future drivetrain configuration of the vehicle. The gear shift may be performed if a comparison of the future drivetrain configuration with a current drivetrain configuration of the vehicle meets a threshold condition. The gear shift may not be performed if the comparison does not meet the threshold condition.

19 Claims, 14 Drawing Sheets

(51) Int. Cl.
*F16H 59/44* (2006.01)
*F16H 59/74* (2006.01)
*F16H 59/14* (2006.01)
*F16H 59/66* (2006.01)
*G06V 10/94* (2022.01)
*G06V 20/58* (2022.01)
*G06V 20/56* (2022.01)
*G06F 18/25* (2023.01)
 B60L 15/20  (2006.01)
 F16H 61/16  (2006.01)
 F16H 59/36  (2006.01)

(56) References Cited

U.S. PATENT DOCUMENTS

| | | | | |
|---|---|---|---|---|
| 11,242,098 B2 * | 2/2022 | Patnaik | ................... | G01S 17/10 |
| 11,427,195 B1 * | 8/2022 | Pertsel | ..................... | B60R 1/00 |
| 2015/0039218 A1 * | 2/2015 | Bowers | ............. | B60W 30/0956 |
| | | | | 701/301 |
| 2022/0147742 A1 * | 5/2022 | El-sawah | .............. | B60W 50/14 |

\* cited by examiner

EFFICIENT AUTOMATIC GEAR SHIFT USING COMPUTER VISION

FIELD OF THE INVENTION

The invention relates to computer vision generally and, more particularly, to a method and/or apparatus for implementing efficient automatic gear shift using computer vision.

BACKGROUND

While some enthusiasts prefer manual transmissions, automatic gear shifting is ubiquitous in vehicles today. Automatic gear shifting is primarily used in conventional internal combustion engine (ICE) vehicles. Most electric vehicles use a single-gear transmission because electric motors provide good power output over a broad RPM range, which allows a gear ratio to be selected that provides an acceptable compromise between acceleration and top speed. However, some electric vehicles are introducing multi-gear transmissions, which provide efficiency for both city and highway driving at the cost of additional complexity.

Generally, gear selection is determined in order to keep the RPM of the vehicle in a reasonable range and also to stay within an optimal region of a torque curve. Therefore, the main input into the calculation for gear selection is the speed of the vehicle. During a gear change, the power delivery is interrupted (i.e., the so-called "shift time"). Avoiding changing gears unnecessarily is desirable. Shift time in modern automatic transmission can be up to a few hundred milliseconds.

Conventional techniques for reducing unnecessary gear shifts and reducing the shift time is accomplished using hysteresis. Hysteresis is used because the speed threshold forgoing from gear N to N+1 is not the same as going back from N+1 to N, resulting in a history or state-dependent system. While the hysteresis techniques can be complex, conventional techniques generally rely only on speed to determine gear shifting.

The conventional techniques do not make use of information about the vehicle surroundings and other factors. Without taking into account other factors, conventional gear shifting techniques can decide to shift to a higher gear just as the vehicle is approaching a lower speed zone, a traffic light, stop sign, etc. Some drivers can downshift when the driver recognizes a different terrain or elevation. However, by not taking into account vehicle surroundings and other factors, automatic gear shifting will result in unnecessary gear shifts, which result in inefficient driving.

It would be desirable to implement efficient automatic gear shift using computer vision.

SUMMARY

The invention concerns an apparatus comprising an interface and a processor. The interface may be configured to receive pixel data of an exterior environment of a vehicle. The processor may be configured to process the pixel data arranged as video frames, perform computer vision operations to detect objects in the video frames, extract characteristics about the objects detected, determine driving conditions in response to an analysis of the characteristics and generate a control signal. The control signal may be configured to perform a gear shift. The driving conditions may be used to predict a future drivetrain configuration of the vehicle. The gear shift may be performed if a comparison of the future drivetrain configuration with a current drivetrain configuration of the vehicle meets a threshold condition. The gearshift may not be performed if the comparison does not meet the threshold condition.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
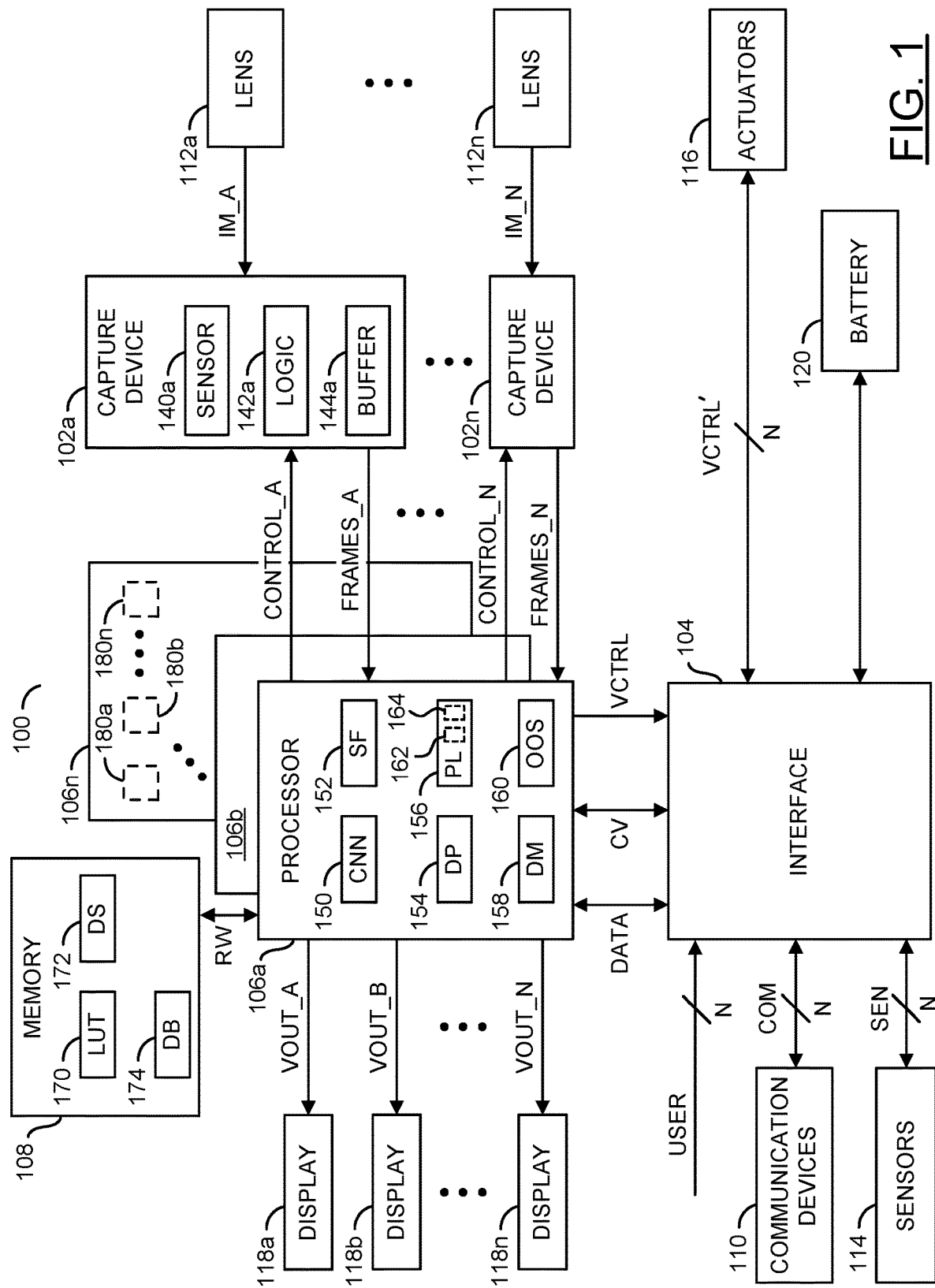
FIG. 1 is a diagram illustrating an embodiment of the present invention.

Embodiments of the present invention include providing efficient automatic gear shift using computer vision that may (i) automate gear shifting by taking into account visual awareness of the surroundings of a vehicle, (ii) perform computer vision to detect upcoming road conditions, (iii) recognize scenarios where the vehicle will speed up or slow down, (iv) enable additional factors other than speed to be used for gear selection, (v) predict a future speed of the vehicle, (vi) implement fleet learning to determine how various factors affect a drivetrain configuration, (vii) reduce a total shift time by efficiently selecting when to change gears, (viii) implement and train a neural network model to maintain an optimal torque, (ix) use information from map data and live traffic data to determine upcoming driving conditions, (x) predict a region of a torque curve for a motor in response to computer vision analysis of video frames and/or (xi) be implemented as one or more integrated circuits.

Embodiments of the present invention may be configured to enable efficient automatic gear shifting for a vehicle.

Computer vision may be implemented to provide additional input that may be used to predict a speed and/or drivetrain configuration of an ego vehicle. Video frames may be analyzed to detect upcoming driving conditions that may impact the future speed and/or future drivetrain configuration of the ego vehicle.

Front-facing cameras on the ego vehicle may capture pixel data that may be analyzed as video frames. Video generated from pixel data generated by other cameras mounted on the vehicle may be analyzed (e.g., a surround view). The video frames may comprise data about where the vehicle is traveling. Computer vision may detect various objects that the vehicle is approaching that may impact the speed and/or drivetrain configuration of the vehicle. In an example, the computer vision may detect speed signs, stop signs, traffic lights, slow traffic ahead, turns that require slowing, etc.

The environment detected may be used to predict a future speed and/or drivetrain configuration of the ego vehicle. In some embodiments, a rule-based approached may be implemented. For example, various types of objects may be associated with particular speeds and/or a range of speeds (e.g., a stop sign may mean zero speed when the ego vehicle reaches the stop sign, a speed limit sign may indicate a range of +/−5 mph of the limit on the sign, etc.). In some embodiments, fleet learning may be implemented to predict future speeds and/or drivetrain configurations based on the current conditions and the detected information extracted from the video frames. A neural network may be implemented to analyze video frames captured by multiple different vehicles to create and analyze a large dataset of environmental conditions near a vehicle and what speed and/or drivetrain configuration actually resulted when reaching the upcoming conditions detected. The future speed and/or drivetrain configuration detected may be used to enable a comparison between future drivetrain configurations and current drivetrain configurations.

The automatic gear selection implemented may be configured to take into account future predicted speed and/or future drivetrain configurations in a decision making process to determine whether to switch the gear of a motor. In an example, the automatic gear selection may determine to change a gear if the objects detected indicate the ego vehicle may speed up. In another example, the automatic gear selection may avoid switching to higher gears if the future predicted speed is lower (e.g., due to upcoming turns, slow traffic, an elevation increase, etc.).

In some embodiments, the automatic gear selection implemented by the present invention may implement a neural network model in order to determine gear selection decisions without making a future speed prediction. The neural network may be configured to receive computer vision information extracted from video frames as input. The training criteria for the neural network model may be to learn which driving conditions relate to minimizing and/or reducing a number of unnecessary gear shifts, an optimal torque behavior, fuel efficiency, maintaining a consistent speed, etc.

In some embodiments, reading a vehicle sensor (e.g., a speedometer, a tachometer, etc.) may be used to determine a current speed and/or current drivetrain conditions and computer vision performed on video frames generated from the vehicle cameras may be used to predict a future speed and/or future drivetrain conditions. For example, the road conditions detected may comprise detecting a difficult terrain that may indicate a slower travel speed (e.g., mud, sand, snow, crushed stone, etc.), a road elevation, a speed limit change, traffic conditions, etc. In an example, a lower gear may be selected when approaching muddy and/or sandy conditions. In some embodiments, the data about upcoming road conditions determined by using the computer vision operations may be augmented and/or enhanced by receiving data from other information sources. In an example, map data that provides information about road surfaces and speed limits may be received and analyzed to predict future drivetrain conditions. In another example, live traffic information may be received and analyzed to predict future drivetrain conditions. In yet another example, crowdsourced information (e.g., information transmitted by nearby drivers and/or historical data from other drivers) may be received and analyzed to predict future drivetrain conditions. The type of data used to determine the upcoming drivetrain conditions may be varied according to the design criteria of a particular implementation.

Predicting the upcoming drivetrain conditions may enable unnecessary gear shifts to be prevented. Preventing a gear shift may avoid a power interruption caused by the shift time caused by the gear shift. Reducing the amount of shift time by preventing gear shifts determined to be unnecessary may increase an efficiency of the vehicle (e.g., fuel efficiency and/or power efficiency).

Referring to FIG. 1, a diagram illustrating an embodiment of the present invention is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, the lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural networks (ANNs) configured to provide artificial intelligence and/or computer vision operations. In an example, the one or more ANNs may comprise a convolutional neural network (CNN) module and/or a generative adversarial network (GAN) trained to provide images processing, object detection, object recognition, object classification, etc. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may implement a low-power system-on-a-chip (SoC). The processors 106a-106n may provide artificial intelligence (AI), advanced image signal processing and high-resolution video compression. The processors 106a-106n may be configured to perform processing locally to enable the apparatus 100 to be implemented in edge devices. The processors 106a-106n may enable edge devices to visually perceive the environment and make decisions based on the data collected from the capture devices 102a-102n and other types of sensors (e.g., the sensors 114). The architecture of the video processing pipeline 156 may enable the processors 106a-106n to support a variety of computer vision processes, such as: object detection, classification and tracking, semantic and instance segmentation, image processing, stereo object detection, terrain mapping, face recognition, etc.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The processors 106a-106n may comprise an interface configured to receive pixel data, video frames, audio data, sensor data, data from external sources, etc. In an example, the interface of the processors 106a-106n may be configured to enable Gigabit Ethernet, a USB 2.0 host and device, multiple (e.g., three) SD card controllers with SDXC support and/or MIPI-DSI/CSI output. The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a passive infrared (PIR) sensor, a thermometer, a gyroscope, a compass, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate airbags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. For example, the processors 106a-106n may be configured to receive triple-sensor video input with high-speed SLVS/MIPI-CSI/LVCMOS interfaces. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The ANNs 150 may be configured to implement various artificial intelligence models. In the example shown, the ANNs 150 may be described as a convolutional neural network module. For simplicity, the ANNs 150 may be described as the CNN module 150. However, other types of artificial intelligence models may be implemented.

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of objects to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding (e.g., 4KP30 AVC and HEVC encoding with multi-stream support) and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The video pipeline module 156 may enable multi-stream support (e.g., generate multiple bitstreams in parallel, each comprising a different bitrate). In an example, the video pipeline module 156 may implement an image signal processor (ISP) with a 320 M Pixels/s input pixel rate. The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine 164 may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The lookup table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. In one example, the hardware modules 180a-180n may be configured to implement various security features (e.g., secure boot, I/O virtualization, etc.). The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 180a-180n and/or the CNN module 150 may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron (or node) in one layer to every neuron (or node) in the other layer. In a fully-connected layer, for n inputs and m outputs, there are n*m weights. There may also be a bias value for each output neuron (or node), resulting in a total of (n+1)*m parameters. An activation function may also be implemented. The activation function may convert an output from the nodes of one layer into an input for the nodes of a next layer. The activation function may provide constraints to the output of a node (e.g., prevent computational issues caused by large values). The activation function may provide non-linearity to the neural network. The non-linearity provided by the activation function may enable classifications of patterns with a high degree of complexity (e.g., highly complex patterns for computer vision). In one example, the activation function may implement a ReLU function.

In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
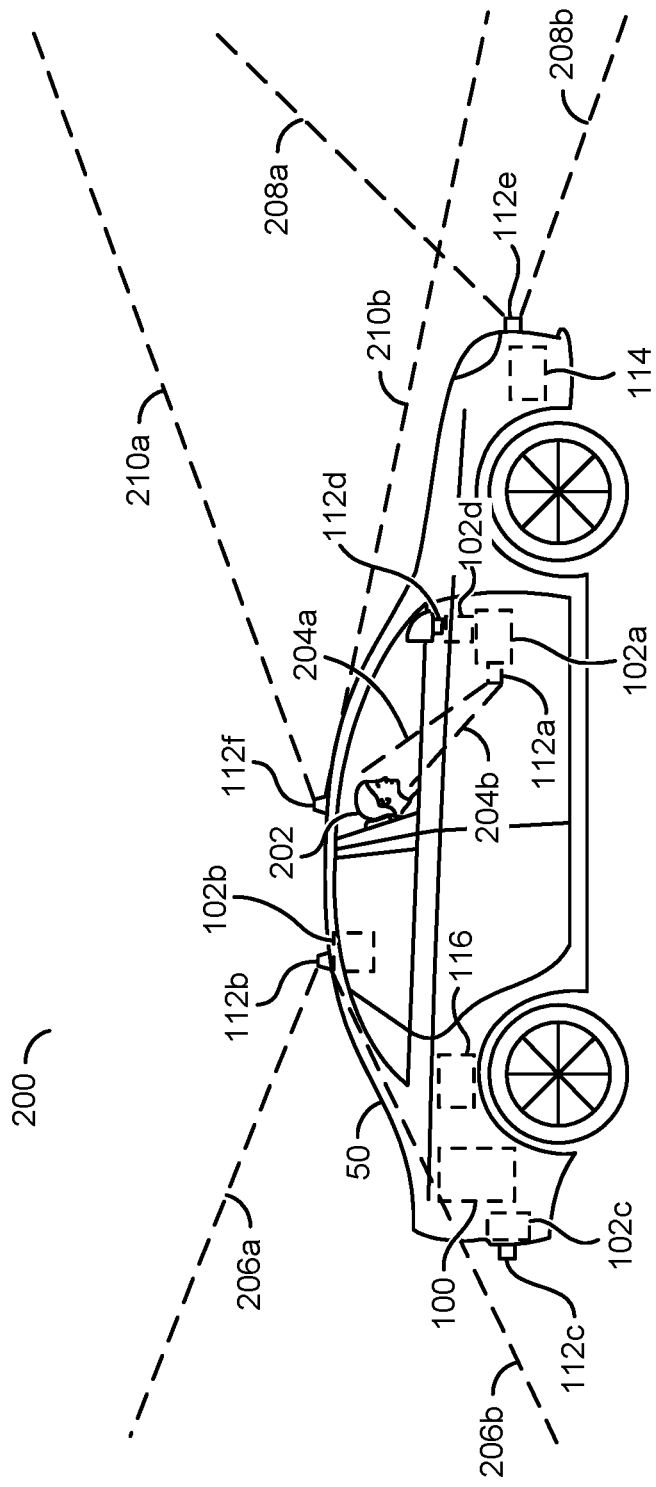
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112v) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices

102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
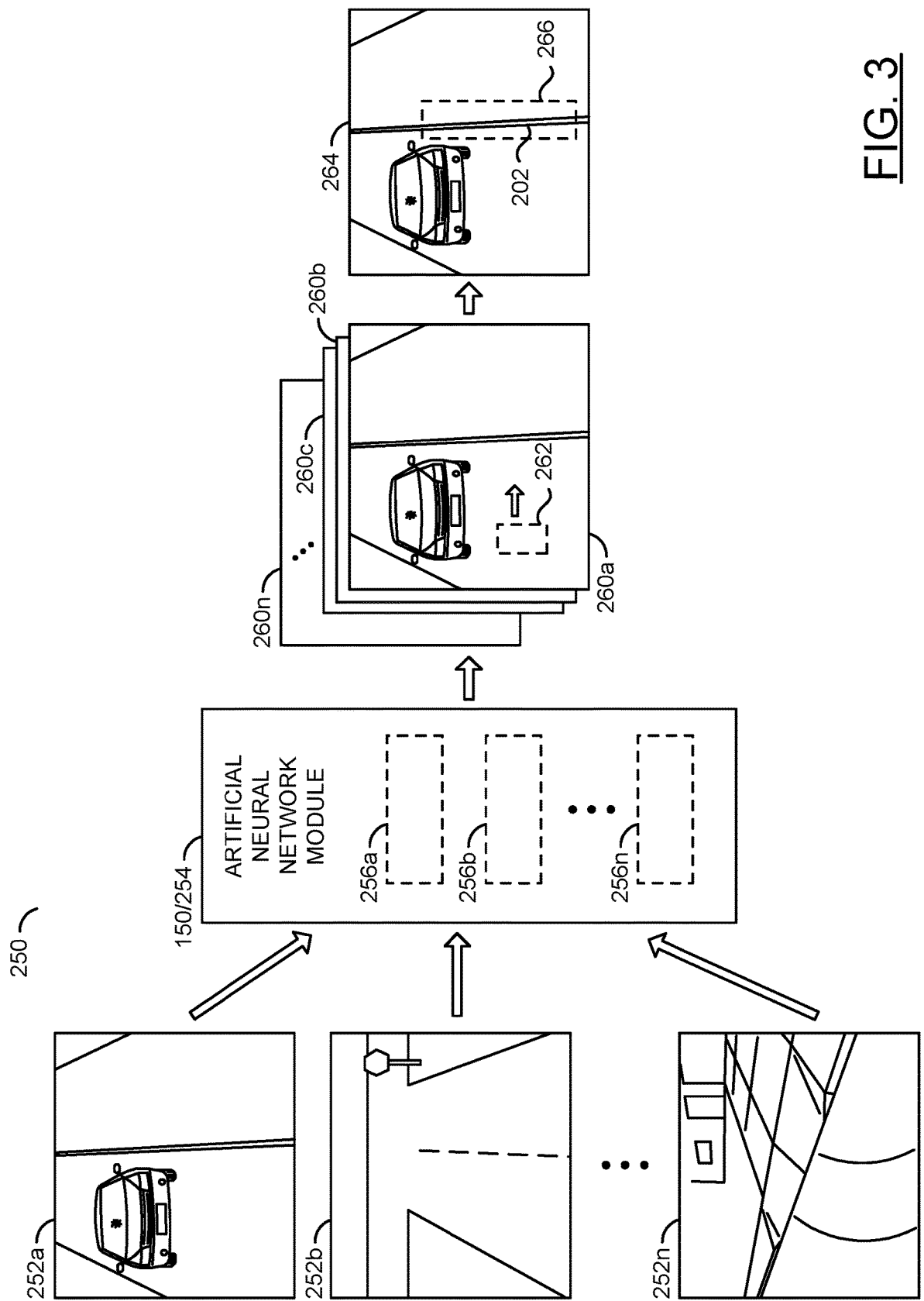
FIG. 3 is a diagram illustrating an example visualization of training a convolutional neural network for object detection using fleet learning.

Referring to FIG. 3, a diagram illustrating an example visualization of training a convolutional neural network for object detection using fleet learning is shown. A training and/or object detection visualization is shown. Images and/or video frames 252a-252n are shown. The images and/or video frames 252a-252n may be training data. The training data 252a-252n may comprise reference images captured from disparate sources. The disparate sources may comprise the video frames FRAMES_A-FRAMES_N processed by the video pipeline module 156 from pixel data and/or video data captured from other sources (e.g., images previously captured by the camera system 100, images received from a database of images (e.g., stock images), images captured by a fleet uploaded to a database of images, etc.). In an example, embodiments of the apparatus 100 may be implemented in a fleet of vehicles (e.g., the ego vehicle 50 and other vehicles may each implement an embodiment of the camera system 100). Each embodiment of the camera system 100 may independently generate video data that may be used as the training data 252a-252n.

To detect objects using computer vision, the convolutional neural network 150 may be trained using the training data 252a-252n. The training data 252a-252n may comprise a large amount of information (e.g., input video frames). For example, multiple vehicles each implementing the camera system 100 may be capable of generating more video data than the camera system 100 installed on the ego vehicle 50 alone. By combining the training data 252a-252n generated from multiple disparate sources (e.g., each implementation of the camera system 100), a greater amount of the training data 252a-252n may be generated and/or a greater variety of the training data 252a-252n may be generated (e.g., video from different types of vehicles, video from different environments, video from different states and/or countries, etc.).

The training data 252a-252n may be labeled. The labels for the training data 252a-252n may be provided as metadata of the video frames. Labeling the training data 252a-252n may enable the CNN module 150 to have a ground truth basis for determining which objects are present in the training data 252a-252n.

A block (or circuit) 254 is shown. The circuit 254 may implement a computing device, a processor and/or a server computer. The circuit 254 may implement a centralized convolutional neural network. The centralized convolutional neural network 254 may comprise blocks (or circuits) 256a-256n. The circuits 256a-256n may implement artificial intelligence models. The centralized convolutional neural network 254 may comprise other components (e.g., a processor, a memory, various dedicated hardware modules, a communication device, etc.). The number, type and/or arrangement of the components of the circuit 254 may be varied according to the design criteria of a particular implementation.

The circuit 254 may be configured to receive the training data 252a-252n. For example, each implementation of the camera system 100 (e.g., installed on multiple different vehicles) may be configured to present the training data 252a-252n to the circuit 254. The labels implemented in the metadata of the training data 252a-252n may comprise information about the video content in the video frame. In an example, if the training data 252a comprises an image of a vehicle, the label may indicate that the video frame comprises a vehicle and/or the particular make/model/year of the vehicle. In another example, if the training data 252i comprises an image of a person, the label may indicate an identity of the person (e.g., for facial recognition), characteristics of the person (e.g., age, gender, height, color of clothing, etc.) and/or behavior of the person (e.g., walking, not moving, reaching, sleeping, etc.). The labels of the training data 252a-252n may provide a ground truth sample. In an example, if the artificial intelligence model 256b is configured to detect a driver (or driver behavior), the training data 252a-252n may provide a ground truth sample of a person performing a particular behavior (e.g., driving). The types of information provided by the labels and/or the format of the labels may be varied according to the design criteria of a particular implementation.

The circuit 254 may be configured to train the artificial intelligence models 256a-256n. The circuit 254 may comprise similar functionality as the CNN module 150. The circuit 254 may have access to greater computing resources (e.g., power, processing capabilities, memory, etc.) than the processors 106a-106n. In an example, the circuit 254 may be implemented as part of a cloud computing service, configured to scale resources based on demand. The additional computing capabilities of the circuit 254 may be capable of handling the large amount of the training data 252a-252n received from the disparate sources.

The AI models 256a-256n may be configured to implement and/or generate a machine readable DAG to detect various objects and/or events. A feature set may be loaded as part of the AI models 256a-256n for analyzing the video frames. The AI models 256a-256n may be continually enhanced in response to the training data 252a-252n. For example, the training data 252a-252n may be used to refine the feature set used to detect objects (e.g., to adjust neural network weight values and/or bias values for the AI models 256a-256n).

The AI models 256a-256n may be generated by the circuit 254 in response to computer vision analysis of the training data 252a-252n. One or more of the AI models 256a-256n may be communicated to the camera system 100. The AI models 256a-256n may be used by the CNN module 150. In an example, the CNN module 150 may implement an AI model, the circuit 254 may receive the training data 252a-252n to refine the AI models 256a-256n, and the CNN module 150 may be updated based on the AI models 256a-256n. Updating the CNN module 150 with one or more of the AI models 256a-256n may enable the CNN module 150 to continually improve the results of the computer vision operations.

The CNN module 150 and the circuit 254 may operate similarly. In some embodiments, the CNN module 150 may receive the training data 252a-252n and update the AI models 256a-256n (e.g., locally). In some embodiments, the circuit 254 may receive the training data 252a-252n and update the AI models 256a-256n for the CNN module 150. For example, the circuit 254 may provide a centralized source for updating the CNN module 150 implemented by multiple implementations of the camera system 100 (e.g., a fleet update). The fleet of vehicles may generate the training data 252a-252n, the circuit 254 may process the training data 252a-252n to update the AI models 256a-256n, and the fleet of vehicles may receive the AI models 256a-256n as an update to the CNN module 150 in order to benefit from the training data 252a-252n generated by the fleet of vehicles. The computer vision operations and/or training performed by the CNN module 150 and the computer vision operations and/or the training performed by the circuit 254 may be implemented similarly. For example, descriptions of operations performed by the circuit 254 may be assumed to apply to the CNN module 150 interchangeably. Similarly, the computer vision operations performed on the training data 252a-252n may be similar to the computer vision operations performed on the video frames FRAMES_A-FRAMES_N generated by the processors 106a-106n.

The artificial intelligence models 256a-256n may be configured to be trained to detect particular objects. Each of the artificial intelligence models 256a-256n may be trained to recognize, classify and/or distinguish one or more types of objects. The number of artificial intelligence models 256a-256n implemented by the CNN module 150 and/or the circuit 254 may be varied according to the design criteria of a particular implementation.

The CNN module 150 may operate in a training mode of operation. In an example, the AI models 256a-256n may be directed acyclic graphs. In the training mode of operation, the AI models 256a-256n may analyze many examples of objects. In one example, if the AI model 256a is configured to detect vehicles, the AI model 256a analyze many examples of vehicle images. Training the AI models 256a-256n may determine and/or calculate parameters, weighting values and/or biases for the directed acyclic graph. The trained AI models 256a-256n may be a DAG with parameters, weighting values and/or biases pre-programmed and/or pre-defined (e.g., based on self-directed learning) for detecting particular types of objects. In some embodiments, the trained AI models 256a-256n may be a quantized neural network (e.g., a reduced size neural network configured to operate on an edge device that has been modified based on a full size neural network that was trained offline (e.g., on the circuit 254).

While the apparatus 100 is in operation, the CNN module 150 may continually learn using new video frames as the input training data 252a-252n. However, the processors 106a-106n may be pre-trained (e.g., configured to perform computer vision before being installed in the vehicle 50). For example, the results of training data 252a-252n (e.g., the machine learning models 256a-256n) may be pre-programmed and/or loaded into the processors 106a-106n. The processors 106a-106n may conduct inferences against the machine learning models 256a-256n (e.g., to perform object detection). In some embodiments, the signal CV generated by the processors 106a-106n may be sent to the interface 104 to enable the communication devices 110 to upload computer vision information (e.g., to the centralized server 254 and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In the example shown, the training data 252a-252n may capture video data of various vehicle occupants (e.g., captured from one of the capture devices 104a-104n that provides in-cabin monitoring of the ego vehicle 50). For example, the training data 252a-252n may be a sequence of video frames captured prior to the processors 106a-106n determining that a change in orientation of various body parts of an occupant has been detected (e.g., caused by an occupant reaching out, an occupant leaning forward, an occupant moving hands and/or arms, etc.). The training data 252a-252n may be labeled based on whether the prediction was incorrect or correct. Using the training data 252a-252n (e.g., video frames captured from many different vehicles as the vehicles are produced, as different vehicles are deployed on the roads, etc.), many training data sets may be available to train the AI models 256a-256n. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 252a-252n may be uploaded to the central CNN module 254 to perform and/or train the AI models 256a-256n for the computer vision. The results (e.g., the AI models 256a-256n) of the training from the central CNN module 254 may be installed on each of the CNN modules 150 of each apparatus 100 (or transmitted while the apparatus 100 is in operation to remotely provide updates via the communication devices 110).

The CNN module 150 and/or the circuit 254 may receive the training data 252a-252n in a training mode of operation. The CNN module 150 may analyze captured video frames (e.g., the signal FRAMES_A-FRAMES_N) to detect object, classify objects and/or extract data about objects using the trained AI models 256a-256n. To perform the training and/or the computer vision operations, the CNN module 150 may generate a number of layers 260a-260n. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window 262 may slide horizontally one pixel to comprise a box of pixels BO through E0 and B3 through E3 (e.g., the pixels from BO through D0 and B3 through D3 are used in both the first and second operation).

The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

Using the input video frames as the training data 252a-252n, the CNN module 150 and/or the AI models 256a-256n may be trained. The training may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the CNN module 150 and/or the AI models 256a-256n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, the machine learning may be performed by the centralized CNN module 254 that has access to greater computing resources than the camera system 100. Generally, the processing capabilities and/or computing resources available to the centralized CNN module 254 (e.g., implemented as part of a cloud computing network) may be greater than the processing capabilities and/or computing resources available to the CNN module 150 implemented by the processors 106a-106n. For example, the centralized CNN module 254 may perform the machine learning using the training data 252a-252n, develop the machine learning models 256a-256n, and then provide the machine learning model 254 to each apparatus 100 in a fleet of vehicles.

Even after the AI models 256a-256n have been trained and/or the CNN module 150 has been deployed, the processors 106a-106n and/or the centralized CNN module 254 may continue to receive the training data 252a-252n from each apparatus 100, refine the machine learning models 256a-256n, and then provide updates to the machine learning model for each apparatus 100 (received using the communication device 110). The centralized CNN module 254 may develop, refine and/or enhance the machine learning models 256a-256n by receiving input (e.g., the training data 252a-252n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning models 256a-256n adapted to the constraints of the edge device. The processors 106a-106n may be configured to compress the machine learning models 256a-256n (e.g., compressed compared to the machine learning models 256a-256n implemented by the centralized CNN module 254). In an example, compressing the machine learning models 256a-256n may comprise quantization, pruning, sparsification, etc. Compressing the machine learning model may enable the CNN module 150 to perform the machine learning and/or conduct inferences against the machine learning models 256a-256n (e.g., object detection). By performing the machine learning at the edge (e.g., locally on the processors 106a-106n), there may be reduced latency compared to performing wireless communication with the centralized CNN module 254. Similarly, the apparatus 100 may be able to perform the machine learning without maintaining a wireless connection. By performing the machine learning at the edge, privacy may be maintained since the training data 252a-252n would be kept local. Performing the machine learning at the edge (e.g., locally), the processors 106a-106n may preserve privacy and avoid heavy video processing running on back-end servers. Whether the machine learning is performed locally (e.g., at the edge), performed using a centralized resource and/or performed using a combination of local and centralized resources may be varied according to the design criteria of a particular implementation.

The machine learning performed by the CNN module 150 and/or the circuit 254 may comprise supervised training. For example, the CNN module 150 may be self-trained using the training data 252a-252n. Supervised learning may enable the CNN module 150 to automatically adjust the weighting values and/or biases in response to metadata contained within the training data 252a-252n (e.g., a designer and/or engineer may not need to program the weighting values for the AI models 256a-256n). The metadata contained within the training data 252a-252n may provide ground truth data. Backpropagation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more likely to determine the presence of a vehicle. Similarly, where the training data 252a-252n is labeled as not providing an image of a vehicle, the CNN module 150 may extract the features from the image and apply the extracted features to the weighting values to make future computer vision operations more likely to determine the presence of a vehicle (e.g., particular weighting values may be decreased to de-emphasize particular features that may not be associated with a vehicle). The CNN module 150 may implement a deep convolutional neural net to enable features to be learned through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Figure 4:
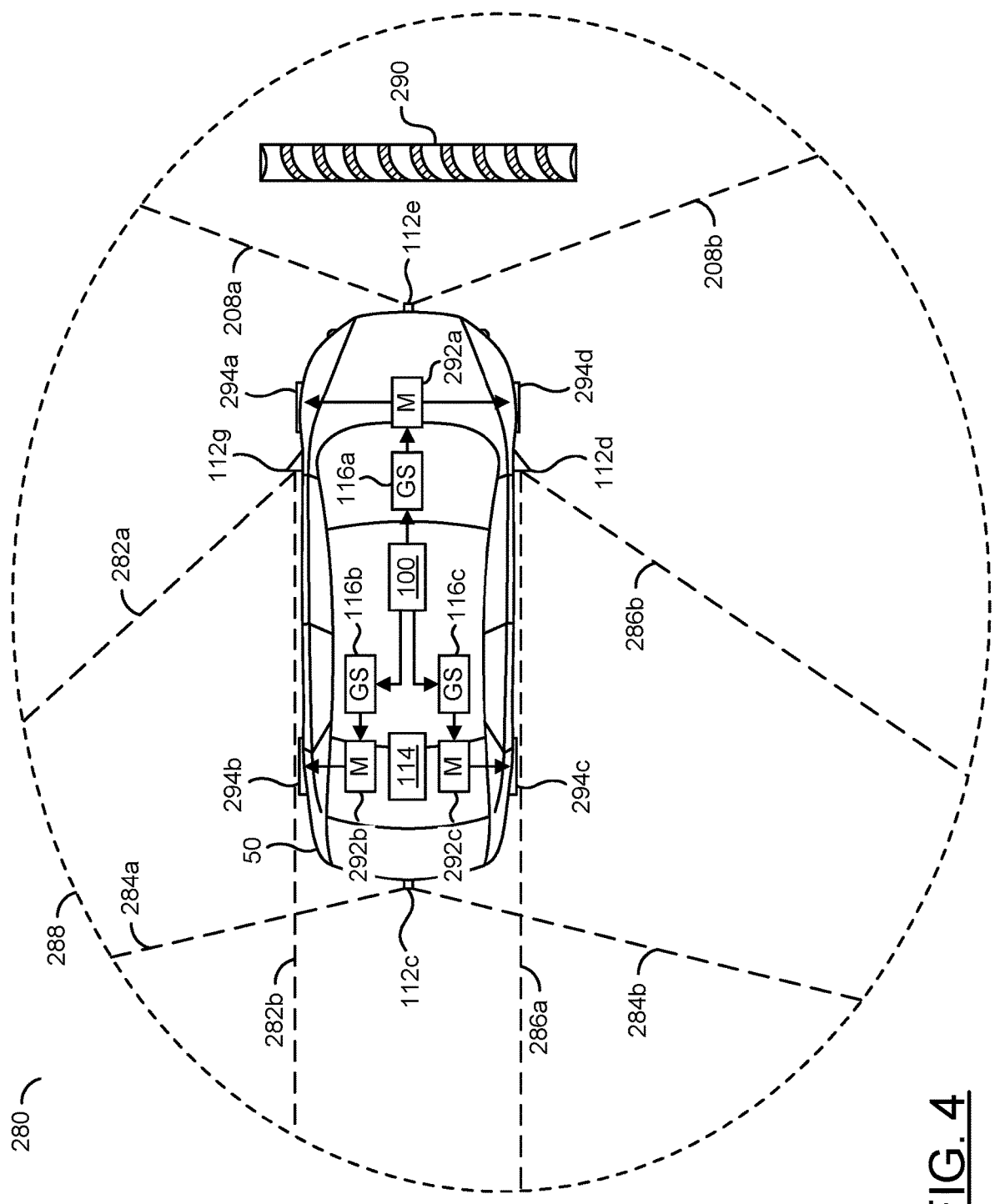
FIG. 4 is a diagram illustrating a 360 degree field of view captured by a vehicle implementing multiple motors.

Referring to FIG. 4, a diagram illustrating a 360 degree field of view captured by a vehicle implementing multiple motors is shown. An overhead view 280 of the ego vehicle 50 is shown. The apparatus 100 is shown within the ego vehicle 50. The sensor 114 is shown on the ego vehicle 50. One or more of the actuators 116a-116c are shown in the ego vehicle 50. The ego vehicle 50 may be an ICE vehicle, a hybrid ICE/electric vehicle, an all-electric vehicle, etc. The ego vehicle 50 may be any vehicle that implements multiple gears for a motor. For example, the apparatus 100 may be implemented mainly in ICE and/or hybrid vehicles. However, the apparatus 100 may be implemented in electric vehicles as multi-gear electric vehicles become more common. The type of the ego vehicle 50 that implements the apparatus 100 may be varied according to the design criteria of a particular implementation.

Each of the lenses 112a-112g may be directed to capture a different field of view. As shown in association with FIG. 2, the lens 112e may capture the field of view 208a-208b (e.g., the lens 112b may capture the field of view 206a-206b and the lens 112f may capture the field of view 210a-210b, but are not shown for illustrative purposes). Dotted lines 282a-282b are shown. The dotted lines 282a-282b may represent the field of view captured by the lens 112g (shown directed towards a rear of the ego vehicle 50 from the driver side mirror location). Dotted lines 284a-284b are shown. The lines 284a-284b may represent the field of view captured by the lens 112c (shown directed behind the ego vehicle 50 from the rear bumper location). Dotted lines 286a-286b are shown. The lines 286a-286b may represent the field of view captured by the lens 112d (shown directed towards a rear of the ego vehicle 50 from the passenger side mirror location). In an example, each of the fields of view captured by the lenses 112a-112g may be presented as video data to the displays 118a-118n and/or analyzed by the processors 106a-106n. The lenses 112a-112g and the corresponding fields of view (e.g., the fields of view 206a-206b, 208a-208b, 210a-210b, 282a-282b, 284a-284b and 286a-286b) are shown as an illustrative example. More lenses (e.g., the lenses 112a-112n) and/or fields of view may be captured by the apparatus 100.

A dotted circle 288 is shown. The dotted circle 288 may represent an exterior field of view from the perspective of the ego vehicle 50 captured by the apparatus 100. The processors 106a-106n may be configured to combine the video data captured by the capture devices 102a-102n to form the exterior field of view 288. The exterior field of view 288 may be a 360 degree field of view (e.g., a field of view that captures video data in all or most directions around the ego vehicle 50, a field of view that surrounds the ego vehicle 50, etc.). The lenses 112a-112g and the corresponding fields of view (e.g., the fields of view 206a-206b, 208a-208b, 210a-210b, 282a-282b, 284a-284b and 286a-286b) and/or data from other lenses (e.g., the lenses 112h-112n, not shown) may be combined to enable the processors 106a-106n to have access to video data over the full 360 degree field of view 288.

In some embodiments, the processors 106a-106n may be configured to perform video stitching operations and/or de-warping operations to form the 360 degree field of view 288. In some embodiments, the processors 106a-106n may be configured to analyze the video data captured by each of the capture devices 102a-102n and aggregate the results to make inferences about all the video data in the 360 degree field of view 288 (e.g., the video data from each field of view may be analyzed individually, and the results may be combined to effectively create the 360 degree field of view 288, even if a single video stream of all 360 degrees around the ego vehicle 50 is never actually created).

While a generally circular shape for the 360 degree field of view 288 is shown, the particular shape of the 360 degree field of view 288 may not be circular. For example, the range of each of the capture devices 102a-102n may be different. In another example, the physical location of the capture devices 102a-102n on the ego vehicle 50 may determine how far from the ego vehicle 50 the field of view 288 is able to reach. The 360 degree field of view may have an irregular shape. The circular shape of the 360 degree field of view 288 is shown for illustrative purposes. For example, the range of the 360 field of view 288 may extend farther from the ego vehicle 50 than shown. In some embodiments, the 360 degree field of view 288 may be spherical (e.g., capture the environment above the ego vehicle 50). In some embodiments, the field of view 288 may not be a full 360 degree field of view (e.g., locations below the ego vehicle 50 may not be captured).

The processors 106a-106n may be further configured to perform computer vision operations on the video data captured in the 360 degree field of view 288 (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

The processors 106a-106n may be configured to perform computer visions on the video frames that comprise the 360 degree field of view 288. Since the ego vehicle 50 generally travels in a forward direction where gear shifting is concerned, the objects detected and/or analyzed by the computer vision operations may mainly be captured by the front camera lens 112e. However, the processor 106a-106n may analyze the road conditions based on the 360 degree field of view 288. For example, images captured to the sides and/or rear of the ego vehicle 50 may be used to identify icy road conditions, curved roads, roads increasing/decreasing in elevation, etc. The 360 degree field of view 288 may provide further contextual information that may be used to augment the data available for making decisions.

An object 290 is shown in front of the ego vehicle 50. The object 290 may be a speed bump. The speed bump 290 may be one example of an object that may be detected by the computer vision operations performed by the processors 106a-106n. For example, the computer vision operations performed by the processors 106a-106n may be configured to detect the object 290, determine a location of the object 290 with respect to the ego vehicle 50 (e.g., distance, direction, relative speed, etc.), determine a size/shape of the object 290, determine other characteristics of the objects 290 (e.g., perform optical character recognition (OCR) to read text written on the object 290, detect a paint pattern on the object 290, determine a height/depth of the object 290, etc.), etc. The object 290 may be detected by the computer vision operations if the ego vehicle 50 is moving and/or if the ego vehicle 50 is stationary. The type of information detected by the processors 106a-106n about the object 290 may be varied according to the design criteria of a particular implementation.

Motors 292a-292c are shown in the ego vehicle 50. In some embodiments, only one motor (e.g., the motor 292a) may be implemented. In the example shown, the motor 292a may be configured to control an RPM of two front wheels 294a-294d, the motor 292b may be configured to control an RPM of the rear wheel 294b and the motor 292c may be configured to control an RPM of the rear wheel 294c. The three motor configuration shown may be common in electric vehicles. The three motor configuration may be shown as a representative example. However, the concepts may be applicable to the ego vehicle 50 implementing one, two, three, four motors or any number of motors.

The sensor 114 is shown. In an example, the sensor 114 may be configured to measure a speed of the ego vehicle 50. The speed of the ego vehicle 50 measured by the sensor 114 may be used by the processors 106a-106n to determine a current speed of the ego vehicle 50. In some embodiments, the sensor 114 may be configured to measure a RPM of one or more of the motors 292a-292c. For example, one implementation of the sensor 114 may be implemented for each of the motors 292a-292c to provide the processors 106a-106n information about the current drivetrain configurations. For example, the sensor 114 may present the signal SEN to the processors 106a-106n to provide information that the processors 106a-106n may interpret to determine the current drivetrain configurations. The number, location and/or type of data measured by the sensor 114 (or sensors) to provide data to the processors 106a-106n about the current drivetrain configurations may be varied according to the design criteria of a particular implementation.

The actuators 116a-116c are shown. The actuators 116a-116c may each implement gearboxes. The actuators 116a-116c may be configured to perform a gear shift for the respective motors 292a-292c. In an example, the processors 106a-106n may determine when to perform, enable and/or disable the gear shift and generate the signal VCTRL. The actuators 116a-116c may perform (or prevent) the gear shift for the motors 292a-292c in response to the signal VCTRL.

In the example shown, one of the actuators 116a-116c may be implemented for a respective one of the motors 292a-292c. In some embodiments, a separate gear selection may be implemented for each different motor. The separate gear selection for each of the motors 292a-292c is shown as a representative example. In some embodiments, one gear selection may be implemented for all of the wheels 294a-294d. In some embodiments, one gear selection may be implemented for the wheels of one axle. In some embodiments, one gear selection may be implemented for each axle. The number of gear selection actuators 116a-116c implemented may be varied according to the design criteria of a particular implementation.

The sensor fusion module 152 may be configured to combine information about the objects detected from analyzing the video data captured with a detection of objects using the proximity sensors (e.g., one or more of the sensors 114a-114n configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114a-114n, the distance limitations of the sensors 114a-114n, whether the computer vision detects the object at a distance beyond the range of the sensors 114a-114n, etc.). The ego vehicle 50 may implement the apparatus 100 that enables computer vision and 360 degree cameras to provide the exterior field of view 288 and the additional sensors 114a-114n (e.g., such as ultrasonics, radars, gyroscope, accelerometer, etc.).

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to (e.g., avoid collisions, provide warnings, store information, avoid roadway hazards such as potholes, etc.). For example, whether a detected scenario is considered an event may be determined by the decision module 158. In one example, the event may correspond to detecting that another vehicle, a pedestrian, a speed bump or another obstacle may be on a collision course with the ego vehicle 50. The events may be detected based on the computer vision operations performed on the video data captured using the lenses 112a-112n. The events may be detected based on readings from the sensors 114a-114n. For example, the sensor fusion module 152 may be configured to combine information determined using the computer vision operations and information detected using the sensors 114a-114n to make inferences that may be used by the decision module 158.

The speed bump 290 may be detected in the field of view 208a-208b (e.g., in front of the ego vehicle 50). The apparatus 100 may detect the objects using the computer vision operations (e.g., by analyzing the pixel data arranged as video frames captured by any of the capture devices 102a-102n). The speed bump 290 may be one example an object detected that may be a road condition. The speed bump 290 may be an object that may cause the ego vehicle 50 (or the driver 202) to slow down, prevent shifting to a higher gear and/or cause the ego vehicle 50 to shift to a lower gear. For example, an upcoming speed bump may be an indication that the future speed of the ego vehicle 50 may be less than the current speed of the ego vehicle 50 (or at least may that the ego vehicle 50 may not speed up until passing the speed bump 290).

The neural network models 256a-256n may be configured to determine a change in speed of the ego vehicle 50 in response to an object. In an example, the computer vision operations performed by the processors 106a-106n may detect the speed bump 290 as an upcoming road condition. The sensor 114 may determine a current speed of the ego vehicle 50. The neural network models 256a-256n may determine a speed change and/or drivetrain conditions change of the ego vehicle 50 in response to the speed bump 290. The speed bump 290 may cause the ego vehicle 50 to change orientation (e.g., temporarily). Generally, for the sensors 114a-114n to detect the change in orientation of the ego vehicle 50, the ego vehicle 50 may drive over the speed bump 290. When driving over the speed bump 290, the front capture device 102e may be capturing the pixel data for the video frames used to perform the computer vision operations (e.g., cameras located on the side of the ego vehicle 50 may detect objects but the ego vehicle 50 generally may not drive over the objects detected by side-mounted cameras). The change in orientation of the vehicle may indicate that the ego vehicle 50 has driven over the speed bump 290. The speed of the ego vehicle 50 when driving over the speed bump 290 may be learned by the neural network models 256a-256n to enable the neural network models 256a-256n to learn a likely speed of the ego vehicle 50 the next time a speed bump object is encountered. The future speed and/or drivetrain conditions may be predicted when another speed bump is encountered based on the learned information from when the speed bump 290 was previously encountered. The future speed and/or drivetrain conditions may be used to determine whether to perform or avoid a gear shift.

In some embodiments, the processors 106a-106n may be configured to generate a notification as a response to the detected (or predicted) event. In one example, the notification may be communicated by the communication devices 110 to the driver 202 along with an annotated video stream. For example, when the decision module 158 determines that an event has been detected the processors 106a-106n may generate the notification as part of (or alongside) one or more of the signals VOUT_A-VOUT_N. In some embodiments, the notification may be communicated by the communication devices 110 to a remote device along with an annotated video stream. For example, when the decision module 158 determines that an event has been detected, the processors 106a-106n may generate the signal VCTRL, which may enable the signal COM to be communicated by the communication devices 110 to a remote device. In an example, the remote device may be a central server and/or a distributed computing service (e.g., as shown in association with FIG. 3).

The annotated video frames (e.g., the training data 252a-252n) may comprise the pixel data that corresponds with the speed bump 290. The apparatus 100 may be configured to use disparate sources of information (e.g., the computer vision operations and readings from one or more of the sensors 114a-114n that may be implemented as gyroscopes) to detect the change in orientation of the ego vehicle 50 and/or the pixel data that corresponds to the speed bump 290. The change in orientation of the ego vehicle 50 may be one data source that indicates that an object that corresponds to a road condition has been detected. The computer vision operations may be another data source that indicates that an object that corresponds to a road condition has been detected. The combination of the data sources may be used to accurately identify the change in road conditions in the video frames. The annotations provided in the video frames communicated to the central/distributed server using the signal COM may be used as the training data 252a-252n.

The current speed and/or drivetrain configuration may be part of the metadata that may be attached to the video data. For example, the speed bump 290 may be detected ahead of the ego vehicle 50. The sensors 114a-114n may measure the drivetrain configuration when the ego vehicle 50 reaches the speed bump 290. The metadata appended to the video frame that comprises the speed bump 290 may provide the computer vision information extracted from the video frames (e.g., information that indicates the characteristics of the speed bump 290) and the information from a later time comprising the drivetrain configurations when the ego vehicle 50 reaches the speed bump 290. The metadata comprising the object detected at a current time and the drivetrain configuration captured at a later time may be used as the training data 252a-252n. The training data 252a-252n may be used to train the artificial intelligence model used for detecting objects by the CNN module 150/254.

The speed bump 290 may be a representative example of a road condition that may be detected by the processors 106a-106n. In an example, the ego vehicle 50 may be accelerating. Normally, while accelerating, one or more of the motors 292a-292c may increase a gear. The processors 106a-106n may be configured to detect the speed bump 290 and recognize the speed bump 290 as a road condition that may result in the ego vehicle 50 decreasing in speed. The processors 106a-106n may compare the current speed and/or drivetrain conditions (e.g., accelerating or traveling at a high speed) to the predicted future speed and/or drivetrain conditions (e.g., slowing down, lowering RPM, traveling at a low speed to traverse the speed bump 290). In one example, in response to detecting the lower upcoming speed, the processors 106a-106n may generate the signal VCTRL to prevent the actuators 116a-116c from performing a gear increase to the respective motors 292a-292c. In another example, in response to detecting the lower upcoming speed, the processors 106a-106n may generate the signal VCTRL to cause the actuators 116a-116c to perform a downshift to change the respective motors 292a-292c to a lower gear. Similarly, in a scenario where road conditions are detected that may indicate acceleration (e.g., a clear road, an increased speed limit, etc.) the processors 106a-106n may generate the signal VCTRL to cause the actuators 116a-116c to perform a gear increase to the respective motors 116a-116c.

Figure 5:
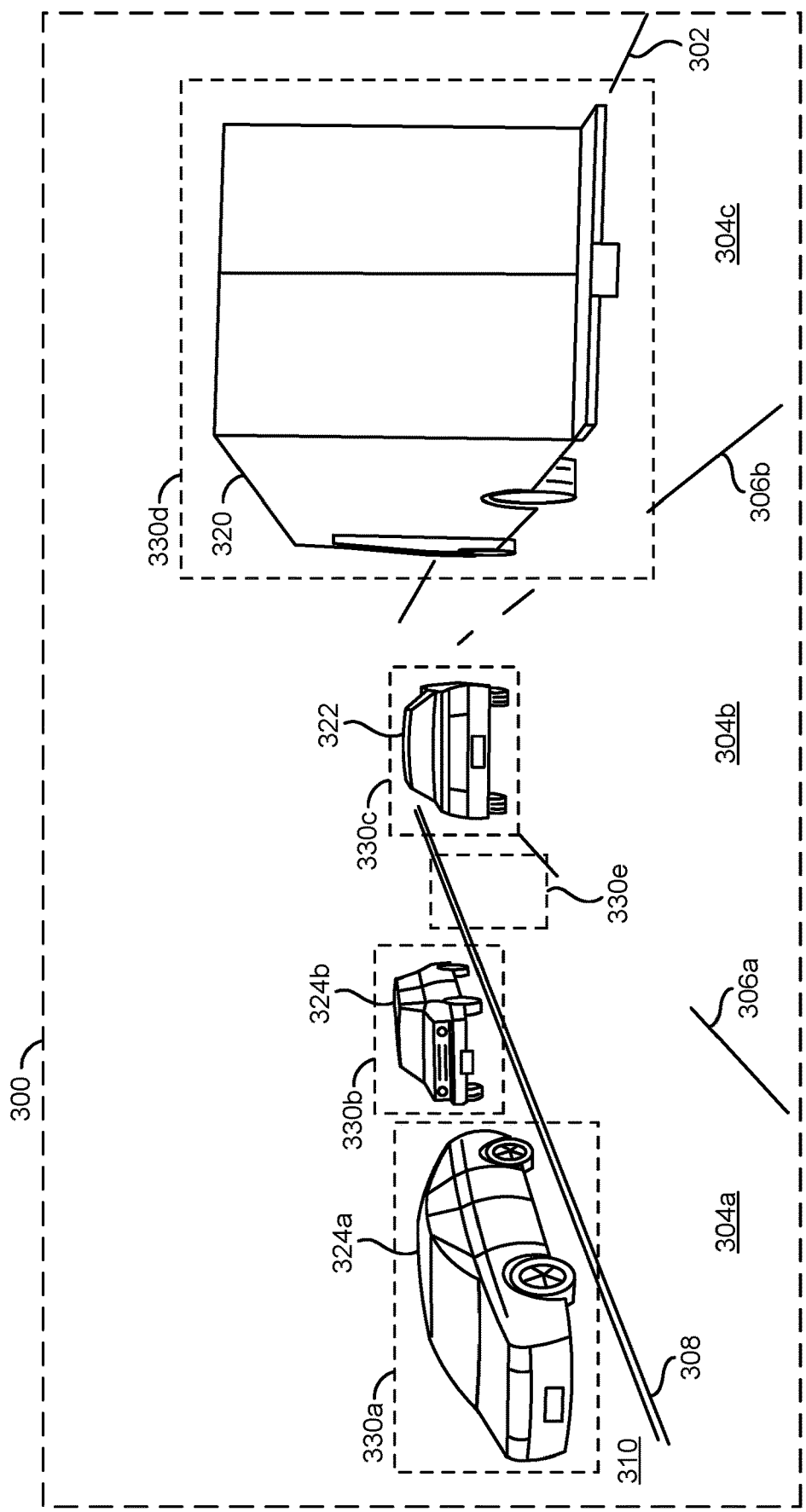
FIG. 5 is a diagram illustrating performing object detection on an example video frame to detect traffic.

Referring to FIG. 5, a diagram illustrating performing object detection on an example video frame to detect traffic is shown. An example video frame 300 is shown. In one example, the example video frame 300 may be a portion (e.g., a subset) of a full video frame captured by one of the capture devices 102a-102n. In another example, the video frame 300 may be a portion of the 360 degree field of view 288 shown in association with FIG. 4. The processors 106a-106n may be configured to generate video data from the video frames FRAMES_A-FRAMES_N that have a sufficiently high resolution that portions of the video frame may have enough detail for computer vision operations to be performed. In an example, digital zooming, dewarping, oversampling and/or cropping may be performed on a full video frame to generate a video frame portion. In another example, the computer vision operations may be performed on a targeted subset of the full video frame. For example, if the full video frame is a 4K resolution video frame, the video frame portion may have sufficient detail for the CNN module 150 to detect objects. The method of generating the video frame 300 (or a portion of the video frame) may be varied according to the design criteria of a particular implementation.

The example video frame 300 may provide an image of the environment near the ego vehicle 50. The example video frame 300 may comprise a view towards the front of the ego vehicle 50. For example, the example video frame 300 may comprise a video frame generated from pixel data captured by the capture device 102e (e.g., a front mounted camera). While other views of the environment may provide information that may be used by the processors 106a-106n to determine future drivetrain parameters and/or drivetrain configurations, generally data analyzed from the front view may be the most relevant. The example video frame 300 may comprise a view from the perspective of the front of the ego vehicle 50 (e.g., the ego vehicle 50 may not be visible for the capture device 102e mounted on a front end of the ego vehicle 50). The processors 106a-106n may be designed with dedicated hardware modules configured to efficiently generate high resolution video frames in real-time and perform the computer vision operations in real-time.

The example video frame 300 may comprise a view of a road 302. The road 302 may be a multi-lane freeway. The road 302 may comprise lanes 304a-304c. In the example shown, the ego vehicle 50 may be driving in a forward direction in the lane 304b. The lane 304a may be to the left of the lane 304b and the lane 304c may be to the right of the lane 304b. The lanes 304a-304c may carry traffic in the same direction (e.g., the lane 304b may be a center lane in a three-lane freeway). Lane dividers 306a-306b are shown. The lane divider 306a may separate the lanes 304a-304b and the lane divider 306b may separate the lanes 304b-304c. A lane divider 308 is shown to the left of the lane 304a. The lane divider 308 may be a double line that separates oncoming traffic. An oncoming traffic lane 310 is shown on the road 302. While only the oncoming traffic lane 310 is shown, the road 302 may have additional oncoming traffic lanes to the left (not shown).

A vehicle 320 is shown in the lane 304c. The vehicle 320 may be a truck traveling in the same direction as and different lane from the ego vehicle 50. A vehicle 322 is shown in the lane 304b. The vehicle 422 may be a car traveling in the same direction and lane as the ego vehicle 50. Vehicles 324a-324b are shown in the oncoming lane 310. The vehicles 324a-324b may be oncoming traffic traveling in a different direction and lane as the ego vehicle 50.

Dotted boxes 330a-330e are shown. The dotted boxes 330a-330e may represent the computer vision operations performed by the processors 106a-106n. The dotted boxes 330a-330e may be objects detected that may affect speed and/or drivetrain configuration of the ego vehicle 50. The CNN module 150 may be configured to detect features and/or descriptors in the example video frame 300 and compare the features and/or descriptors against the features and/or descriptors learned from the training data 252a-252n in order to recognize the pixels of the video frame 300 that correspond to various objects. While only the objects 330a-330e are shown detected in the example video frame 300, the processors 106a-106n may be configured to detect other objects in the video frame that may or may not be relevant to determining speed and/or drivetrain configuration of the ego vehicle 50 (e.g., the road, license plates, buildings, people, animals, bicycles, etc.). For examples, the objects 330a-330e may correspond to the driving conditions used to determine whether or not to enable a gear shift. The types of objects detected may be varied according to the design criteria of a particular implementation.

The dotted boxes 330a-330e may comprise the pixel data corresponding to an object detected by the computer vision operations pipeline 162 and/or the CNN module 150. The dotted boxes 330a-330e are shown for illustrative purposes. In an example, the dotted boxes 330a-330e may be a visual representation of the object detection (e.g., the dotted boxes 330a-330e may not appear on an output video frame displayed on one of the displays 118a-118n). In another example, the dotted boxes 330a-330e may be a bounding box generated by the processors 106a-106n displayed on the video frame to indicate that an object has been detected (e.g., the bounding boxes 330a-330e may be displayed in a debug mode of operation). The number and/or types of objects detected by the processors 106a-106n may be varied according to the design criteria of a particular implementation.

The bounding boxes 330a-330e may correspond to the region of the example video frame 300 that comprises the road 302. The objects 330a-330e may be detected as a sub-portion of the example video frame 300 that comprises the road (e.g., the processors 106a-106n may limit the search region for detecting the objects 330a-330e that may affect the future speed and/or drivetrain configuration of the ego vehicle 50 to the region of the video frame 300 that corresponds to the road 302). For example, the processors 106a-106n may intelligently analyze the video frame 300 to limit the amount of processing power and/or processing time used to search for the objects 330a-330e that may affect the future speed and/or drivetrain configuration of the ego vehicle 50. Intelligently analyzing a sub-portion of the video frame 300 may be more efficient than analyzing the entire video frame 300. For example, a lower granularity analysis (e.g., using less processing resources) of the video frame 300 may be performed to detect the general area of the road 302 and then a higher granularity analysis (e.g., using more processing resources) of the sub-region of the video frame 300 with the detected road 302 may be performed to detect the objects 330a-330e that may affect the future speed and/or drivetrain configuration of the ego vehicle 50. For example, the processors 106a-106n may intelligently make an assumption that objects that are not on the road 302 may be unlikely to affect the speed and/or future drivetrain configuration of the ego vehicle 50. The type of analysis and the processing resources used for particular regions of the example video frame 300 may be varied according to the design criteria of a particular implementation.

The video frame 300 may comprise a representative example of the ego vehicle 50 traveling on a road and analyzing traffic conditions to predict an upcoming speed and/or drivetrain configuration. The processors 106a-106n and/or the decision module 158 may analyze the objects 330a-330e to determine how the objects 330a-330e may affect a future speed and/or drivetrain configuration of the motors 292a-292c.

The objects 330a-330b may be detected as oncoming vehicles that may not have an impact on the future speed and/or drivetrain configuration of the ego vehicle 50 (e.g., the ego vehicle 50 may not speed up or slow down due to the oncoming vehicles 324a-324b traveling in a different direction in a different lane). In response to detecting the objects 330a-330b, the processors 106a-106n may determine that the lane 310 is inaccessible to the ego vehicle 50 (e.g., the driver 202 is unlikely to drive in oncoming traffic).

The object 330c may be detected as a vehicle that may potentially slowdown the ego vehicle 50. The object 330c may be the vehicle 322 traveling in the same lane 304b as the ego vehicle 50, which may affect the future speed and/or drivetrain configuration of the ego vehicle 50. In one example, if the object 330*c* is moving slower than a current speed of the ego vehicle 50, then the ego vehicle 50 may slow down, which may indicate that a gear increase should not be performed. In another example, if the object 330*c* is moving the same speed or faster than the ego vehicle 50, then the object 330*c* may not affect the future speed and/or drivetrain configuration of the ego vehicle 50.

The object 330*d* may be detected as a vehicle that may or may not potentially slowdown the ego vehicle 50. The object 330*d* may be the truck 320 traveling in the different lane 304*c* than the ego vehicle 50. Objects in a different lane may not affect the future speed and/or drivetrain configuration. But the object 330*d* may suddenly change lanes and move into the same lane 304*b* or the ego vehicle 50 may change to the lane 304*c*, which may cause the object 330*d* to affect the future speed and/or drivetrain configuration of the ego vehicle 50. The processors 106*a*-106*n* may determine a probability that the object 330*d* may change lanes (e.g., based on other traffic and/or road signs detected). The CNN module 150 may detect the object 330*d* as the truck 320. Transport trucks may generally be slower moving vehicles. For example, the processors 106*a*-106*n* may analyze the type of object to determine a probability that the particular objects 330*a*-330*e* may affect the future speed and/or drivetrain configuration of the ego vehicle 50. For example, a motorcycle may be less likely to slow down the ego vehicle 50 than a transport truck.

In one example, if the object 330*d* is moving slower than a current speed of the ego vehicle 50, then the ego vehicle 50 may not necessarily slow down, because the ego vehicle 50 may not be affected by the object 330*d*. However, the processor 106*a*-106*n* may determine the object 330*d* is highly likely to change lanes (e.g., if the lane 304*c* is detected as ending ahead) and block the ego vehicle 50, which may indicate that a gear increase should not be performed.

The object 330*e* may be detected as an open lane. The object 330*e* may represent an object that may not cause the ego vehicle 50 to slow down. The object 330*e* may be the lane 304*a* (e.g., an alternate lane), which may not necessarily affect the ego vehicle 50 driving in the lane 304*b*. While the object 330*e* may not cause the ego vehicle 50 to slow down (e.g., not the same lane and not an object that would potentially block the ego vehicle 50), the open lane object 330*e* may represent an opportunity to avoid slowing down. For example, if the object 330*c* may cause the ego vehicle 50 to slow down, the ego vehicle 50 may not have an option to change to the lane 304*c* due to the object 330*d*. However, the open lane object 330*e* may provide an opportunity for the ego vehicle to pass the object 330*c*.

In an example, the processors 106*a*-106*n* may analyze driving patterns of the driver 202 to determine whether the driver 202 would be likely or unlikely to pass the object 330*c* if the object 330*c* was moving slowly. For example, some drivers may slow down and remain behind the object 330*c* (e.g., and the processors 106*a*-106*n* may prevent a gear increase). In another example, some drivers may pass the object 330*c* by moving to the alternate lane 304*a* to maintain or increase speed (e.g., and the processors 106*a*-106*n* may enable a gear increase). In some embodiments, the ego vehicle 50 may be an autonomously controlled vehicle, and the processors 106*a*-106*n* may read upcoming decisions to determine whether the ego vehicle 50 may pass the object 330*c*.

The decision module 158 may weigh multiple factors to make a determination about the future speed and/or drivetrain configuration of the ego vehicle 50. The determination may be provided as a confidence level. The confidence level may provide a numerical and/or computer readable representation of how likely the result of the determination is correct. For example, if the decision module 158 determines that the ego vehicle 50 will slow down with a confidence level that is greater than a threshold level, then the processors 106*a*-106*n* may not generate the signal VCTRL (e.g., to prevent a gear shift). The threshold level may be a pre-defined and/or programmable value.

The processors 106*a*-106*n* may analyze each of the objects 330*a*-330*e* individually and in relation with each other. For example, the object 330*d* being a truck may increase a confidence level that the ego vehicle 50 may slow down, while the object 330*d* not being in the same lane as the ego vehicle 50 may decrease a confidence level that the ego vehicle 50 may slow down. In another example, the object 330*c* being a fast moving vehicle may decrease a confidence level that the ego vehicle 50 will slow down. In yet another example, the driver 202 having a history of aggressive driving may increase a confidence level that the ego vehicle 50 may move to the lane 304*a* to pass the object 330*c* (e.g., decrease a confidence level that the ego vehicle 50 may slow down). Each factor may have a different amount of weighting applied to the final confidence level score. The various weights and/or biases applied to each factor for each of the objects 330*a*-330*e* may be varied according to the design criteria of a particular implementation.

The processors 106*a*-106*n* may analyze multiple video frames in a sequence of captured video frames to enable an analysis of the objects 330*a*-330*e* overtime. For example, the object 330*d* in the different lane 304*c* may not currently affect the speed of the ego vehicle. However, by analyzing a location of the object 330*d* in the video frame 300, the processors 106*a*-106*n* may detect the object 330*d* moving from the lane 304*c* to the lane 304*b*, which may result in the object 330*d* affecting the speed of the ego vehicle 50.

Metadata may be applied to each video frame captured. The metadata may comprise information about the objects detected, the features extracted, the movement determined and/or the future speed and/or drivetrain configuration predicted. In an example, metadata applied to the example video frame 300 may comprise information detected using the computer vision operations (e.g., the object 330*c* being directly ahead of the ego vehicle 50, the object 330*c* slowing down, the potential option of changing to the open lane object 330*e*, the object 330*d* being a transport truck, etc.). The decision module 158 may use the metadata applied to multiple video frames to predict the future speed and/or drivetrain configuration. In an example, in a first video frame, the metadata may provide one set of information (e.g., the object 330*d* in the different lane 304*c*, the object 330*c* moving slowly), and a next video frame may comprise metadata that provides another set of information (e.g., the object 330*c* speeding up, the object 330*d* moving into the same lane 304*b*) and the decision module 158 may analyze the metadata from the multiple video frames to make a determination (e.g., the ego vehicle 50 may slow down, the ego vehicle 50 may maintain speed, the ego vehicle 50 may speed up, etc.).

Figure 6:
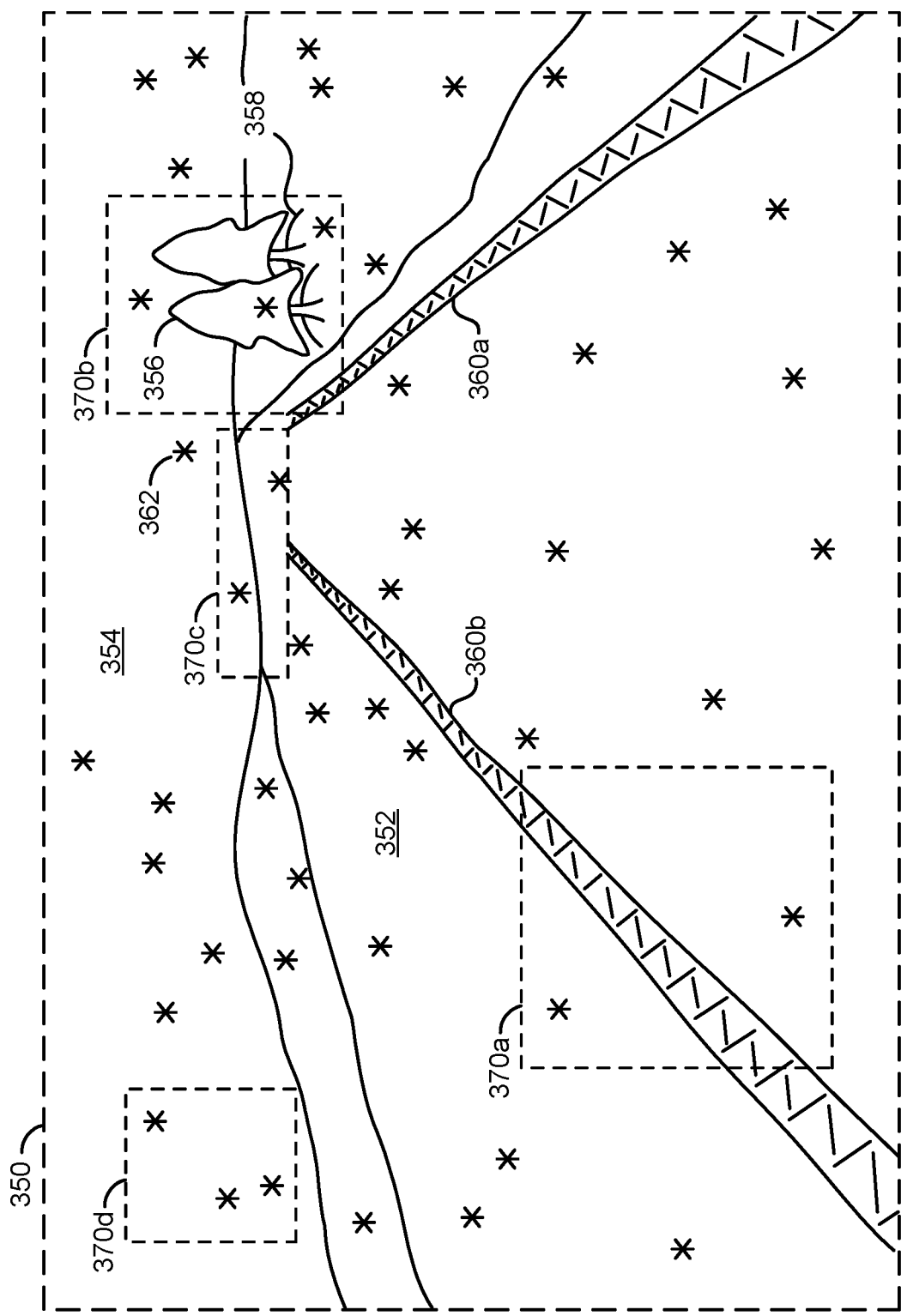
FIG. 6 is a diagram illustrating performing object detection on an example video frame to detect upcoming terrain.

Referring to FIG. 6, a diagram illustrating performing object detection on an example video frame to detect upcoming terrain is shown. An example video frame 350 is shown. The example video frame 350 may be generated and/or analyzed similar to the example video frame 300 shown in association with FIG. 5.

The example video frame 350 may comprise a video frame captured of the environment to the front of the ego vehicle 50. The example video frame 350 may comprise a snowy environment. The snowy environment of the example video frame 350 may be a representative example of an environment that may be detected by the processors 106a-106n that corresponds to terrain that may slow down the ego vehicle 50. Other types of environments may be detected that slow down the ego vehicle 50 (e.g., muddy terrain, wet roads, icy roads, inclined roads, bumpy roads, deteriorating roads, etc.). The types of terrain detected using the computer vision operations may be varied according to the design criteria of a particular implementation.

The example video frame 350 may comprise a snowy road 352 and a sky region 354. The example video frame 350 may comprise trees 356 and snow mounds 358 near the trees 356. Tire tracks 360a-360b are shown on the snowy road 352. A snowflake 362 is shown in the sky region 354. The snowflake 362 may be a representative example of multiple slowflakes in the example video frame 350 (e.g., only a single snowflake is labeled for illustrative purposes).

Dotted boxes 370a-370d are shown in the example video frame 350. The dotted boxes 370a-370d may represent objects detected by the CNN module 150. The detection of the objects 370a-370d may be similar to the detection of the objects 330a-330e described in association with FIG. 5. The objects 370a-370d may comprise objects detected that have been determined by the processors 106a-106n to potentially impact the future speed and/or drivetrain configuration of the ego vehicle 50 (e.g., objects that may affect driving conditions). The computer vision operations performed by the CNN module 150 may detect other types of objects. The number and/or type of objects detected by the CNN module 150 may be varied according to the design criteria of a particular implementation.

The detected object 370a may comprise the tire tracks 360a-360b. The detected object 370a may be detected in the foreground of the example video frame 350, which may indicate that the tire tracks 360a-360b are near the ego vehicle 50. The detected object 370a may be analyzed by the processors 106a-106n to determine the terrain that the ego vehicle 50 is driving on. In an example, the detected object 370a may indicate that the road 352 is snowy, which may indicate that the ego vehicle 50 has low traction and may drive slow. In another example, the detected object 370a may indicate that the tire tracks 360a-360b may provide better traction on the snowy road 352 than areas that are completely covered in snow, which may indicate that the ego vehicle 50 may be able to speed up compared to when driving on freshly fallen show. For example, the decision module 158 may determine that while the tires 294a-294d are able to stay on the tire tracks 360a-360b the ego vehicle 50 may be able to maintain a steady, slow speed (e.g., no gear increase or decrease).

The detected object 370b may comprise the trees 356 and the snow mounds 358. Since the detected object 370b is not on the snowy road 352, the detected object 370b may not have an effect on the speed and/or drivetrain configuration of the ego vehicle 50. In some embodiments, the processors 106a-106n may monitor the snow collecting on the detected object 370b over time in order to predict road conditions. For example, if the detected object 370b is accumulating snow, the road conditions of the snowy road 352 may get worse (e.g., the ego vehicle 50 may have to slow down as snow accumulates). While the trees 356 and the snow mounds 358 are shown as a representative example for monitoring snow accumulation, other objects may be monitored to detect deteriorating driving conditions. For example, if the capture device that captured the video frame 350 was an interior dash cam, the hood of the ego vehicle 50 may be captured and snow accumulating on the hood may be used to monitor the amount of snowfall over time.

The detected object 370c may comprise the snowy road 352 in the distance (e.g., near the horizon with the sky region 354). The detected object 370c may comprise a portion of the snowy road 352 that does not comprise the tire tracks 360a-360b. Without the tire tracks 360a-360b the traction for the ego vehicle 50 may be worse than when the ego vehicle 50 is able to drive on the tire tracks 360a-360b. The processors 106a-106n may be configured to compare the object 370a comprising a portion of the snowy road 352 captured near the ego vehicle 50 with the object 370c comprising a portion of the snowy road 352 in the distance. The decision module 158 may determine that the current traction with the tire tracks 360a-360b may be better than the upcoming traction in the detected object 370c without the tire tracks 360a-360b. The decision module 158 may determine that the ego vehicle 50 may slow down based on the changing driving conditions (e.g., predict the future speed and/or drivetrain configuration of the ego vehicle 50). For example, the processors 106a-106n may generate the signal VCTRL to prevent a gear shift increase since the ego vehicle 50 may likely slow down due to the change in driving conditions.

The detected object 370d may comprise snowflakes. The snowflakes may indicate that the snowy road 352 may accumulate snow over time. The snowflakes may enable the processors 106a-106n to distinguish between various road conditions (e.g., distinguish a snowy road from a muddy road). The snowflakes may indicate that traction may be low for the snowy road 352. In an example, in response to the detected object 370d, the processors 106a-106n may generate the signal VCTRL to perform a downshift. Generally, when driving on snowy terrain, driving in a lower gear may provide better traction.

The processors 106a-106n may be configured to extract the characteristics of the snowy road 352. For example, the road markings may not be visible (e.g., possibly indicating unsafe driving conditions). The snowflakes 362 and/or the tire tracks 360a-360b may indicate that the road 352 may be covered in snow and/or that the ego vehicle 50 may lose traction. In some embodiments, the computer vision operations performed by the processors 106a-106n may be configured to measure a depth of the snow mounds 358 (e.g., by comparing to the video frame 350 captured during warm weather, based on a depth of the hood snow build-up, adding an accumulation of snow based on how much snow has been cleared from the hood by the windshield wipers, based on previous video frames before the snowfall, etc.) to determine how much snow has fallen (e.g., to determine whether or not enough snow has fallen to change the driving conditions that may result in the ego vehicle 50 slowing down). Based on the computer vision operations performed on the example video frame 350, the decision module 158 may determine whether or not to shift gears.

The sensor fusion module 152 may further analyze weather from the external weather service and/or retrieve sensor readings. In the example shown, the sensor 114i may be a temperature gauge that indicates a low temperature. The external weather service may indicate that the weather includes snowfall (e.g., including an amount of precipitation predicted) and/or freezing temperatures. Based on the combination of disparate data sources analyzed by the sensor fusion module 152, the decision module 158 may predict a future speed and/or drivetrain configuration of the ego vehicle 50 based on the driving conditions detected.

Figure 7:
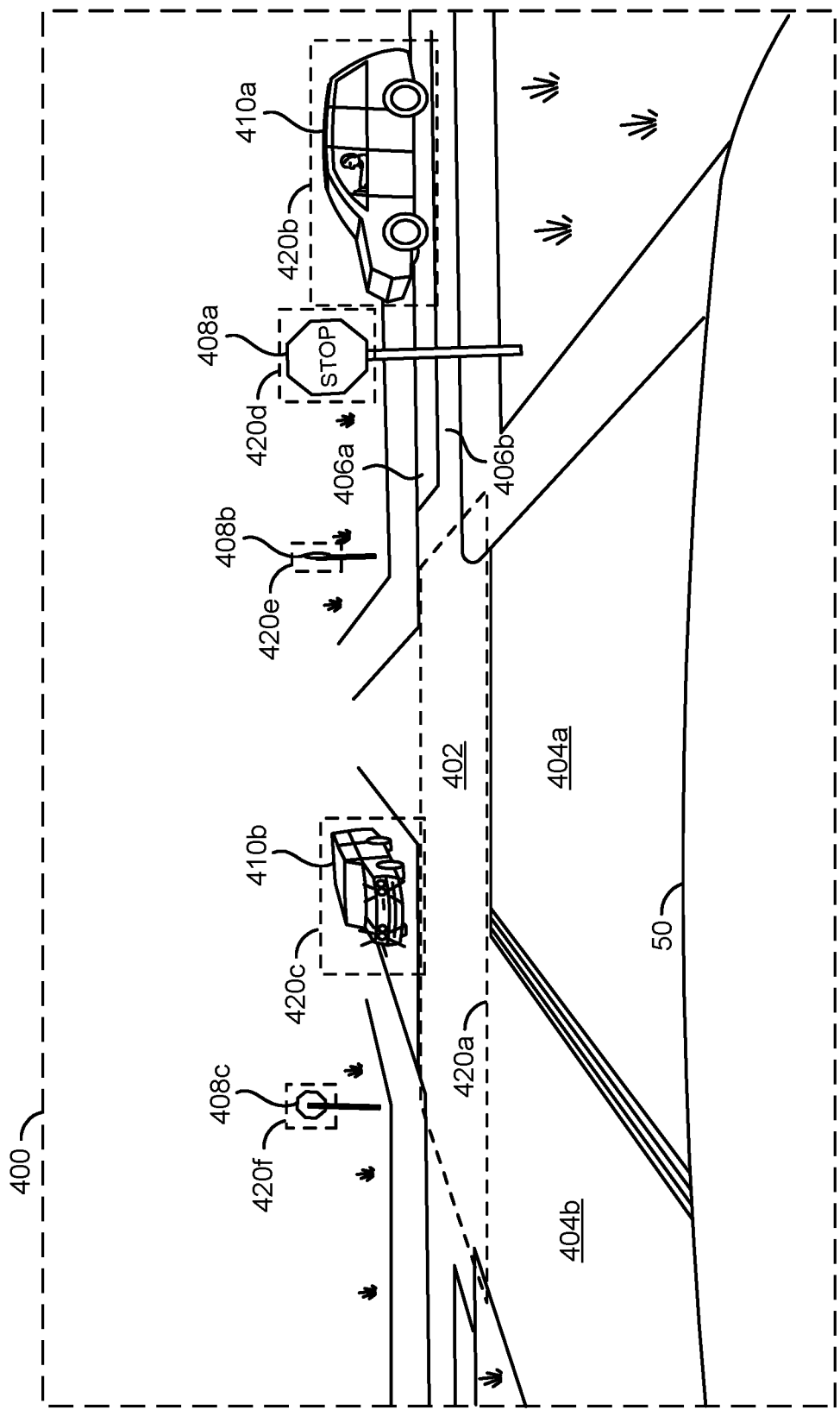
FIG. 7 is a diagram illustrating performing object detection on an example video frame to detect an intersection.

Referring to FIG. 7, a diagram illustrating performing object detection on an example video frame to detect an intersection is shown. An example video frame 400 is shown. The example video frame 400 may be generated and/or analyzed similar to the example video frame 300 shown in association with FIG. 5. In the example shown, the example video frame 400 may be captured by one of the capture devices 102a-102n implemented as a dash-mounted camera (e.g., the hood of the ego vehicle 50 is shown at the bottom of the video frame 400).

The example video frame 400 may comprise a video frame captured of the environment to the front of the ego vehicle 50. The example video frame 400 may comprise an intersection environment. The intersection environment of the example video frame 400 may be a representative example of an environment that may be detected by the processors 106a-106n that corresponds to driving conditions that may slow down the ego vehicle 50. The example video frame 400 may illustrate a four-way intersection with stop signs. Other types of intersection environments may be detected that slow down the ego vehicle 50 may be a three-way or two-way intersection, intersections with traffic lights, school crossings, railway crossings, bus zones, crosswalks, etc. The types of intersection detected using the computer vision operations may be varied according to the design criteria of a particular implementation.

The example video frame 400 may capture a view of the area outside of the ego vehicle 50 showing an intersection 402. The ego vehicle 50 is shown in a lane 404a. A lane 404b is shown adjacent to the lane 404a. A road having lanes 406a-406b is shown perpendicular to the lanes 404a-404b and meeting the lanes 404a-404b at the intersection 402. Road signs 408a-408c are shown. The road signs 408a-408c may be stop signs. The stop sign 408a may be located next to the lane 404a and facing the ego vehicle 50. The stop sign 408b may be next to the lane 406a. The stop sign 408c may be next to the lane 404b on an opposite side of the intersection 402 and facing away from the ego vehicle 50. Vehicles 410a-410b are shown. The vehicle 410a may be in the perpendicular lane 406a and facing the stop sign 408b. The vehicle 410b may be in the oncoming lane 404b across the intersection 402 and facing the stop sign 408c.

The processors 106a-106n may be configured to perform the computer vision operations on the video frame 400. The CNN module 150 may detect and/or recognize objects and/or characteristics of objects. The characteristics of the objects may be extracted in order to enable the decision module 158 to determine the road and/or driving conditions. In the example shown, the CNN module 150 may detect objects such as the vehicles 410a-410b and/or the stop signs (e.g., infrastructure) 408a-408c. The CNN module 150 may be configured to detect and/or recognize the pattern (e.g., arrangement, shape, etc.) of the road. For example, the CNN module 150 may detect and/or recognize the lanes 404a-404b and/or the lanes 406a-406b arranged as the intersection 402. Furthermore, the CNN module 150 may recognize other objects such as the lane markers, the curb, the sidewalk, the stop line, pedestrians, painted road signs (e.g., turning lane indicators), pedestrian cross-walks, traffic lights, etc. The number and/or types of objects detected, classified and/or recognized by the CNN module 150 may be varied according to the design criteria of a particular implementation.

Dotted boxes 420a-420f are shown in the example video frame 400. The dotted boxes 420a-420f may represent objects detected by the CNN module 150. The detection of the objects 420a-420f may be similar to the detection of the objects 330a-330e described in association with FIG. 5. The objects 420a-420f may comprise objects detected that have been determined by the processors 106a-106n to potentially impact the driving conditions (e.g., affect the future speed and/or drivetrain configuration of the ego vehicle 50). The computer vision operations performed by the CNN module 150 may detect other types of objects. The number and/or type of objects detected by the CNN module 150 may be varied according to the design criteria of a particular implementation.

The detected object 420a may comprise the intersection 402. The characteristics extracted from the detected object 420a may be that the intersection 402 is a four-way intersection with the stop signs 408a-408c. The detected object 420a may be detected in a region that the ego vehicle 50 is approaching (e.g., ahead and nearby the ego vehicle 50). In some scenarios, the intersection 402 may indicate that the ego vehicle 50 may slow down (e.g., to stop for safe crossing and/or to comply with the rules and regulations for driving). For example, the processors 106a-106n may use the local rules stored in and/or interpreted by the driving policy module 154 to determine the rules of the road for a particular driving condition. In some scenarios, the intersection 402 may not indicate that the ego vehicle 50 may slow down (e.g., the ego vehicle 50 may have right of way). The processors 106a-106n may perform the computer vision operations on the example video frame 400 as a whole in order to understand the full context of the detected objects 420a-420f and how the detected objects 420a-420f affect the driving conditions.

The detected object 420b may comprise the vehicle 410a (e.g., a detected vehicle). The characteristics of the detected object 420b may comprise a vehicle that is stopped at the intersection 402 at a location perpendicular to the ego vehicle 50. The processors 106a-106n may infer that the detected object 420b may potentially cross paths with the ego vehicle 50 (e.g., causing the ego vehicle 50 to slow down). The processors 106a-106n may further infer that the detected object 420b has the right of way (e.g., the vehicle 410a may already be stopped at the stop sign 408b before the ego vehicle 50 reaches the intersection 402). For example, based on the detected scenario, the decision module 158 may infer with a high confidence level that the ego vehicle 50 may slow down because of the detected object 420b.

The detected object 420c may comprise the vehicle 410b (e.g., a detected vehicle). The characteristics of the detected object 420c may comprise a vehicle that is stopped at the intersection 402 at a location opposite to the ego vehicle 50. The processors 106a-106n may analyze multiple characteristics of the detected object 420c with respect to the ego vehicle 50. In an example, if the vehicle 410b is driving straight through the intersection 402, then the vehicle 410b may not cause the ego vehicle 50 to slow down unless the ego vehicle 50 is turning left at the intersection 402. In another example, if the vehicle 410b is turning left at the intersection 402, then the vehicle 410b may cause the ego vehicle 50 to slow down (e.g., the detected object 420c would cross the path of the ego vehicle 50). For example, the CNN module 150 may analyze the lights of the vehicle 410b to search for a turn signal to determine whether the vehicle 410b is turning or going straight. The processors 106a-106n may infer that the detected object 420c may not likely cross paths with the ego vehicle 50 (e.g., have no effect on causing the ego vehicle 50 to slow down). The processors 106a-106n may further infer that the detected object 420c has the right of way (e.g., the vehicle 410b may already be stopped at the stop sign 408c before the ego vehicle 50 reaches the intersection 402). For example, based on the detected scenario, the decision module 158 may infer with a low confidence level that the ego vehicle 50 may not slow down because of the detected object 420c (e.g., vehicle 410b is more likely to be going straight through the intersection 402).

The detected object 420d may be the stop sign 408a facing the ego vehicle 50. The processors 106a-106n may be configured to determine that the road sign is a stop sign (e.g., using a combination of OCR, shape recognition and color recognition). The processors 106a-106n may determine that the detected object 420d may indicate that the road and/or driving conditions may cause the ego vehicle 50 to slow down with a high confidence level (e.g., the driver 202 would be breaking the law if the stop sign 408a is ignored). The processors 106a-106n may further take into account the driving behavior of the driver 202 to determine a likelihood that the driver 202 would ignore the stop sign 408a.

The detected object 420e may be the stop sign 408b. The processors 106a-106n may be configured to determine that the road sign is a stop sign (e.g., using shape and color recognition in combination with determining a perspective and distance from the object 420e to detect how the shape of the stop sign 408b may be distorted with respect to the ego vehicle 50). The processors 106a-106n may determine that the detected object 420e may not apply to the ego vehicle 50 directly (e.g., the stop sign 420e is not facing the lane 404a). The processors 106a-106n may be configured to determine that the detected object 420e may indirectly affect the speed of the ego vehicle 50 based on various inferences made from the stop sign 408b (e.g., the vehicle 410a may stop before crossing the intersection 402, the vehicle 410a may have right of way, the intersection 402 is a four-way intersection, etc.).

The detected object 420f may be the stop sign 408c. The processors 106a-106n may be configured to determine that the road sign is a stop sign (e.g., using shape and color recognition in combination with determining a perspective and distance from the object 420f to detect how the shape of the stop sign 408c may be distorted with respect to the ego vehicle 50). The processors 106a-106n may determine that the detected object 420f may not apply to the ego vehicle 50 directly (e.g., the stop sign 420f is not facing the lane 404a). The processors 106a-106n may be configured to determine that the detected object 420f may indirectly affect the speed of the ego vehicle 50 based on various inferences made from the stop sign 408c (e.g., the vehicle 410b may stop before crossing the intersection 402, the vehicle 410b may have right of way, the intersection 402 is a four-way intersection, etc.).

Generally, the characteristics of the detected object 420d alone (e.g., the stop sign 408a facing the ego vehicle 50) may be sufficient for the decision module 158 to determine that the driving conditions indicate the ego vehicle 50 may slow down (or come to a complete stop). The processors 106a-106n may prevent a gear increase in response to detecting the stop sign 408a. Similarly, a red traffic light facing the ego vehicle 50 may be sufficient for the decision module 158 to determine that the driving conditions indicate the ego vehicle 50 may slow down (or come to a complete stop). The characteristics of the other detected objects 420a-420c and 420e-420f may provide further context and/or increase the confidence level for the decision. For example, based on previously detected driving habits, the processors 106a-106n may determine that the driver 202 may run the stop sign 408a if no other traffic is around, but would be unlikely to run the stop sign 408a because of a potential collision with the detected object 420b.

The apparatus 100 may be configured to distinguish between objects interior to the ego vehicle 50 (e.g., if the capture device 102a is mounted within the ego vehicle 50 and directed outwards) and objects exterior to the vehicle 50. The processors 106a-106n may be configured to determine a distance to the detected objects 408a-408c and/or 410a-410b. For example, depth-sensing techniques may be implemented to determine a relative distance of the detected objects from the ego vehicle 50.

In the example shown, the computer vision operations may be performed on the single video frame 400. In some embodiments, the video frame 400 may comprise multiple fields of view captured by more than one of the capture devices 102a-102n and stitched together by the processors 106a-106n to generate a panoramic and/or spherical video frame. Generally, the apparatus 100 may perform computer vision operations on a series (e.g., temporally related) of video frames. Performing the computer vision operations on a series and/or sequence of video frames may enable the processors 106a-106n to make inferences about one or more of the objects. In one example, inferences may be determined about the movement of the vehicle 410a. For example, by performing computer vision operations over a series of video frames, the speed of the vehicle 410a may be determined. The processors 106a-106n may determine that the vehicle 410a is decelerating as the intersection 402 is approached. In another example, the processors 106a-106n may infer that the vehicle 410b is stopped at the intersection 402 if the vehicle 410b has not moved for a number of video frames. The movement of the objects may be determined based on changes in relative positions of objects in the series of video frames and may account for the movement of the ego vehicle 50.

Figure 8:
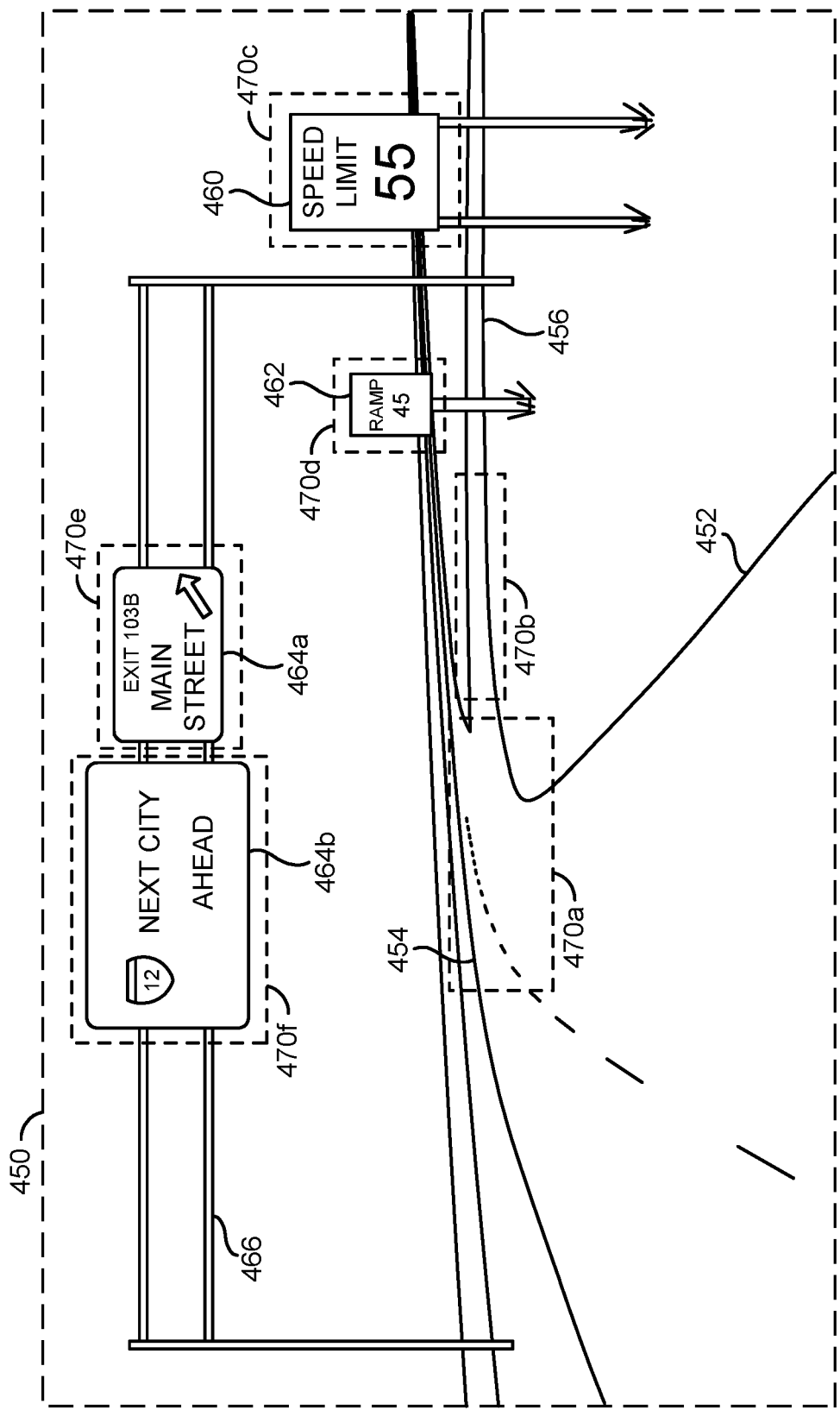
FIG. 8 is a diagram illustrating performing object detection on an example video frame to detect road curves that may affect driving conditions.

Referring to FIG. 8, a diagram illustrating performing object detection on an example video frame to detect road curves that may affect driving conditions is shown. An example video frame 450 is shown. The example video frame 450 may be generated and/or analyzed similar to the example video frame 300 shown in association with FIG. 5.

The example video frame 450 may comprise a video frame captured of the environment to the front of the ego vehicle 50. The example video frame 450 may comprise a curved road environment. The curved road environment of the example video frame 450 may be a representative example of an environment that may be detected by the processors 106a-106n that corresponds to driving conditions that may slow down the ego vehicle 50. The example video frame 450 may illustrate a freeway with an off-ramp and speed limit signs. Other types of driving conditions detected that slow down the ego vehicle 50 may be right-angle turns, yield signs, emergency vehicles on the side of the road, inclined roads, declined roads, etc. The types of driving conditions detected using the computer vision operations may be varied according to the design criteria of a particular implementation.

The example video frame 450 may capture a view of the area outside of the ego vehicle 50 showing a road 452, a curved road 454, an off-ramp 456, a speed limit sign 460, a speed limit sign 462, street signs 464a-464b and an overhead signpost 466. The ego vehicle 50 may be driving on the road 452 (e.g., a freeway). The road 452 may become the curved road 454 ahead. The off-ramp 456 may extend from the road 452. The off-ramp 456 may have a sharper curve than the curved road 454. The speed limit sign 460 may provide a speed limit (e.g., 55 mph) for the road 452 and the curved road 454. The speed limit sign 462 may provide a speed limit (e.g., 45 mph) for the off-ramp 456. The overhead signpost 466 may hold the street signs 464a-464b. The street signs 464a-464b may provide navigational data.

Dotted boxes 470a-470f are shown in the example video frame 450. The dotted boxes 470a-470f may represent objects detected by the CNN module 150. The detection of the objects 470a-470f may be similar to the detection of the objects 330a-330e described in association with FIG. 5. The objects 470a-470f may comprise objects detected that have been determined by the processors 106a-106n to be driving conditions that may potentially impact the future speed and/or drivetrain configuration of the ego vehicle 50. The computer vision operations performed by the CNN module 150 may detect other types of objects. The number and/or type of objects detected by the CNN module 150 may be varied according to the design criteria of a particular implementation.

The detected object 470a may be a detection of the slight curve of the curved road 454. The detected object 470a may cause the ego vehicle 50 to slow down (e.g., for traction to navigate the curve). The processors 106a-106n may analyze the angle and/or radius of the curved road 454. In an example, the decision module 158 may determine that the curved road 454 does not have a large/sharp enough curve that may cause the ego vehicle 50 to slow down. For example, the driving conditions detected by analyzing the curved road 454 may be determined to not affect the status of the gears of the ego vehicle 50.

The detected object 470b may be a detection of the sharp curve of the off-ramp 456. The detected object 470b may cause the ego vehicle 50 to slow down (e.g., for traction to navigate the curve). The processors 106a-106n may analyze the angle and/or radius of the off-ramp 456. In an example, the decision module 158 may determine that the off-ramp 456 does have a large/sharp enough curve that may cause the ego vehicle 50 to slow down. For example, the driving conditions detected by analyzing the off-ramp 456 may be determined to affect the status of the gears of the ego vehicle 50.

The detected object 470c may be the speed limit sign 460. The processors 106a-106n may perform computer vision operations and/or OCR in order to extract the speed limit indicated by the detected object 470c. The processors 106a-106n may be configured to compare the current speed of the ego vehicle 50 to the speed indicated by the detected object 470c to determine whether or not to enable a gear increase. The processors 106a-106n may use the speed limit extracted from the detected object 470c to provide context for determining whether the ego vehicle 50 may slow down for the curve of the curved road 454. The speed limit extracted from the detected object 470c may be used to determine the driving conditions resulting from the curved road 454. The speed limit extracted from the detected object 470c may be used to determine a future speed and/or drivetrain configuration of the ego vehicle 50.

The detected object 470d may be the speed limit sign 462. The processors 106a-106n may perform computer vision operations and/or OCR in order to extract the speed limit indicated by the detected object 470d. The processors 106a-106n may be configured to compare the current speed of the ego vehicle 50 to the speed indicated by the detected object 470d to determine whether or not to enable a gear increase. The processors 106a-106n may use the speed limit extracted from the detected object 470d to provide context for determining whether the ego vehicle 50 may slow down for the curve of the off-ramp 456. In an example, detecting the word 'ramp' on the detected object 470d may enable the processors 106a-106n to associate the detected object 470d with the off-ramp 456 rather than the curved road 454. The speed limit extracted from the detected object 470d may be used to determine the driving conditions resulting from the off-ramp 456. The speed limit extracted from the detected object 470d may be used to determine a future speed and/or drivetrain configuration of the ego vehicle 50. The speed limit extracted from the detected object 470d may only be relevant if the ego vehicle 50 exits from the road 452 and onto the off-ramp 456.

The detected objects 470e-470f may correspond to the street signs 464a-464b, respectively. The processors 106a-106n may perform computer vision operations and/or OCR in order to extract navigation data from the detected objects 470e-470f. The processors 106a-106n may determine that the extracted navigation data for the detected object 470e may correspond to the off-ramp 456 and the extracted navigation data for the detected object 470f may correspond to the curved road 454. The extracted navigation data may provide an additional, disparate source of data that the sensor fusion module 152 may use to predict the upcoming driving conditions for the ego vehicle 50. In an example, the extracted navigation data from the computer vision operations may be compared to navigation data (e.g., from a GPS/GNSS device, from a map data service, etc.). For example, if the navigation data indicates that the driver 202 is driving to main street, then the processors 106a-106n may determine based on the extracted navigation data from the detected objects 470e-470f that the ego vehicle 50 may take the off-ramp 456 (e.g., the street sign 464a may indicate that the off-ramp 456 leads to main street, in the example shown). In another example, if the navigation data indicates that the driver 202 is driving to the next city, then the processors 106a-106n may determine based on the extracted navigation data from the detected objects 470e-470f that the ego vehicle may drive on the curved road 454 (e.g., the street sign 464b may indicate that the curved road 454 leads to the next city, in the example shown). The extracted navigation data may indirectly be used to determine which upcoming driving conditions may be used to predict the future drivetrain configuration of the ego vehicle 50.

In an example, if the navigation data provided by a map data service indicates that the driver 202 is driving to the next city, the processors 106a-106n may determine that the ego vehicle 50 is traveling on the curved road 454. The driving conditions of the curved road 454 may be selected for predicting the future drivetrain configuration of the ego vehicle 50. The analysis of the driving conditions of the curved road 454 may indicate that the curve may not cause the ego vehicle 50 to slow down. The sensor 114 of the ego vehicle 50 may indicate the current speed of the ego vehicle 50 is 55 mph. The speed limit on the speed limit sign 460 may indicate that the ego vehicle 50 may not have to slow down for the curved road 454. The decision module 158 may determine with a high confidence level that the ego vehicle 50 may maintain or increase a speed and a gear shift increase may be allowed.

In another example, if the navigation data provided by a map data service indicates that the driver 202 is driving to main street, the processors 106a-106n may determine that the ego vehicle 50 is traveling on the off-ramp 456. The driving conditions of the off-ramp 456 may be selected for predicting the future drivetrain configuration of the ego vehicle 50. The analysis of the driving conditions of the off-ramp 456 may indicate that the curve may cause the ego vehicle 50 to slow down. The sensor 114 of the ego vehicle 50 may indicate the current speed of the ego vehicle 50 is 55 mph. The speed limit on the speed limit sign 460 may indicate that the ego vehicle 50 may slow down to at least 45 mph for the off-ramp 456 (e.g., the speed limit of the sign is determined to be less than the current speed of the ego vehicle 50). The decision module 158 may determine with a high confidence level that the ego vehicle 50 may decrease a speed and a gear shift increase may be prevented.

Figure 9:
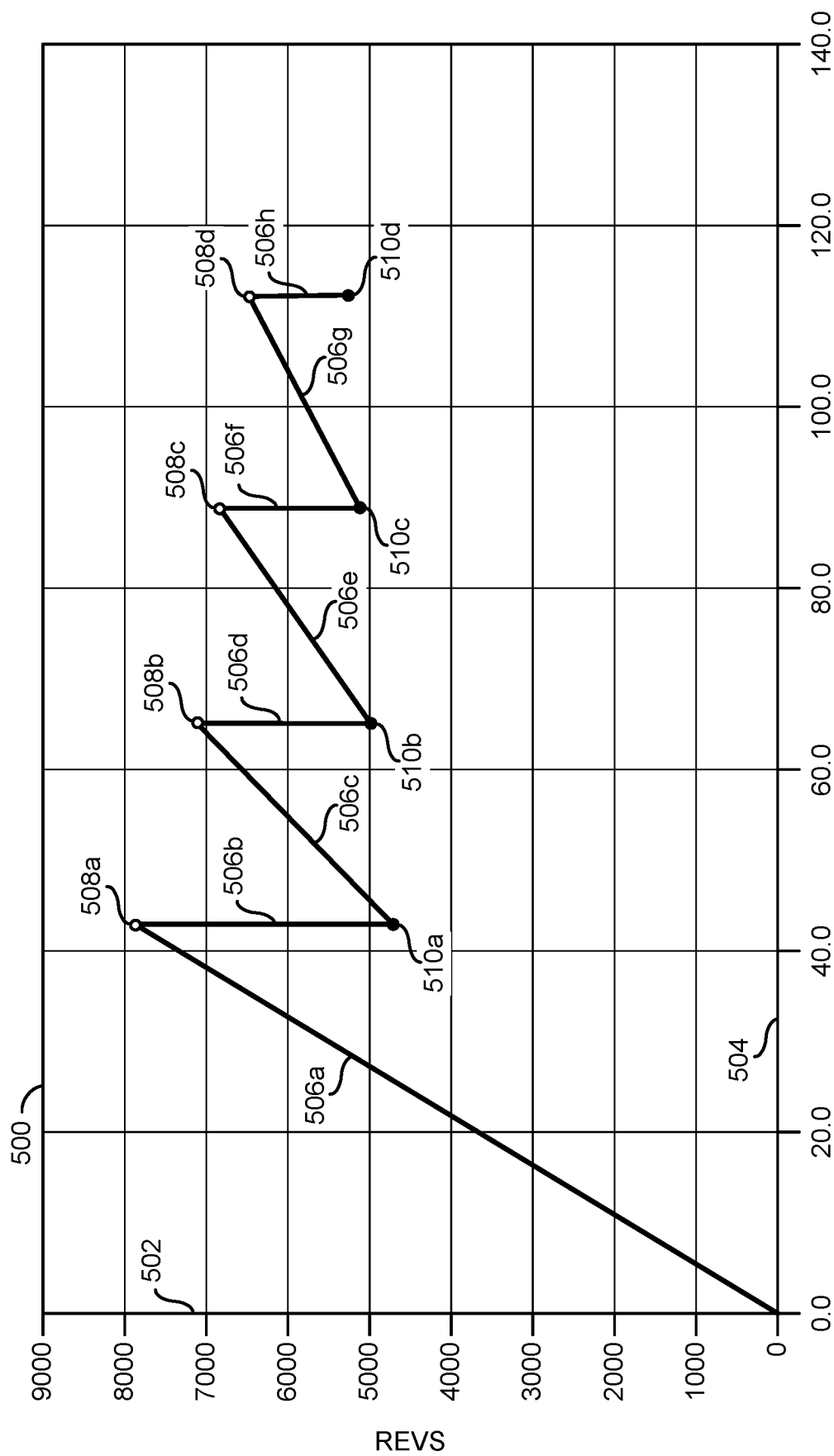
FIG. 9 is a diagram illustrating gear changes based on speed and RPM.

Referring to FIG. 9, a diagram illustrating gear changes based on speed and RPM is shown. A graph 500 is shown. The graph 500 may comprise a y-axis 502 and an x-axis 504. The y-axis 502 may comprise revolutions per minute of one or more of the motors 292a-292c. The x-axis 504 may comprise a speed of the ego vehicle 50 in mph. The graph 500 may illustrate example optimal gear shift points for the motors 292a-292c.

A segmented line 506a-506h is shown. The segmented line 506a-506h may illustrate the RPM of one or more of the motors 292a-292c as a function of the speed of the ego vehicle 50. The segments of the segmented line 506a-506h may comprise upper limits 508a-508d for RPM for a number of gears of the motors 292a-292c. The segments of the segmented line 506a-506h may comprise lower limits 510a-510d for RPM for a number of gears of the motors 292a-292c. Generally, the criteria for shifting from a particular gear to another gear may be different depending on the current gear of the ego vehicle 50.

The line segment 506a may illustrate a first gear for the motors 292a-292c. The upper limit 508a may represent an optimal RPM for changing to the second gear. In the first gear, the ego vehicle 50 may have an RPM of approximately 7786 at approximately 42 mph. For example, if the ego vehicle 50 is traveling in the first gear and the future predicted speed is greater than 42 mph, then the processors 106a-106n may enable the gear shift to the second gear. If the future predicted speed is less than 42 mph, then the processors 106a-106n may prevent the unnecessary gear shift.

The line segment 506b may illustrate a drop in RPM when shifting from the first gear to the second gear. For example, the shift to second gear may drop the RPM from the upper limit 508a (e.g., 7786 RPM) to the lower limit 510a for the second gear (e.g., 4687 RPM) at approximately 42 mph. The line segment 506c may illustrate a second gear for the motors 292a-292c. The upper limit 508b may represent an optimal RPM for changing to the third gear. In the second gear, the ego vehicle 50 may have an RPM of approximately 7069 at approximately 63 mph. For example, if the ego vehicle 50 is traveling in the second gear and the future predicted speed is greater than 63 mph, then the processors 106a-106n may enable the gear shift to the third gear. If the future predicted speed is less than 63 mph, then the processors 106a-106n may prevent the unnecessary gear shift.

The line segment 506d may illustrate a drop in RPM when shifting from the second gear to the third gear. For example, the shift to third gear may drop the RPM from the upper limit 508b (e.g., 7069 RPM) to the lower limit 510b for the third gear (e.g., 4980 RPM) at approximately 63 mph. The line segment 506e may illustrate a third gear for the motors 292a-292c. The upper limit 508c may represent an optimal RPM for changing to the fourth gear. In the third gear, the ego vehicle 50 may have an RPM of approximately 6794 at approximately 90 mph. For example, if the ego vehicle 50 is traveling in the third gear and the future predicted speed is greater than 90 mph, then the processors 106a-106n may enable the gear shift to the fourth gear. If the future predicted speed is less than 90 mph, then the processors 106a-106n may prevent the unnecessary gear shift.

The line segment 506f may illustrate a drop in RPM when shifting from the third gear to the fourth gear. For example, the shift to fourth gear may drop the RPM from the upper limit 508c (e.g., 6794 RPM) to the lower limit 510c for the fourth gear (e.g., 5108 RPM) at approximately 90 mph. The line segment 506g may illustrate a fourth gear for the motors 292a-292c. The upper limit 508d may represent an optimal RPM for changing to the fifth gear. In the fourth gear, the ego vehicle 50 may have an RPM of approximately 6456 at approximately 112 mph. For example, if the ego vehicle 50 is traveling in the fourth gear and the future predicted speed is greater than 112 mph, then the processors 106a-106n may enable the gear shift to the fifth gear. If the future predicted speed is less than 112 mph, then the processors 106a-106n may prevent the unnecessary gear shift. The line segment 506h may illustrate a drop in RPM when shifting from the fourth gear to the fifth gear. For example, the shift to fifth gear may drop the RPM from the upper limit 508d (e.g., 6456 RPM) to the lower limit 510d for the fifth gear (e.g., 5255 RPM) at approximately 112 mph.

The speed and RPM may be the drivetrain conditions that may be analyzed and/or predicted by the processors 106a-106n. For example, the decision module 158 may determine whether to enable and/or disable a gear shift based on the future RPM predicted. The future RPM may be determined based on the predicted speed determined from the driving conditions extracted from the video frames. The decision module 158 may be configured to determine when to enable a gear shift in order to ensure that the gear shifts occur at the optimal RPM values (e.g., the upper limits 508a-508d).

Figure 10:
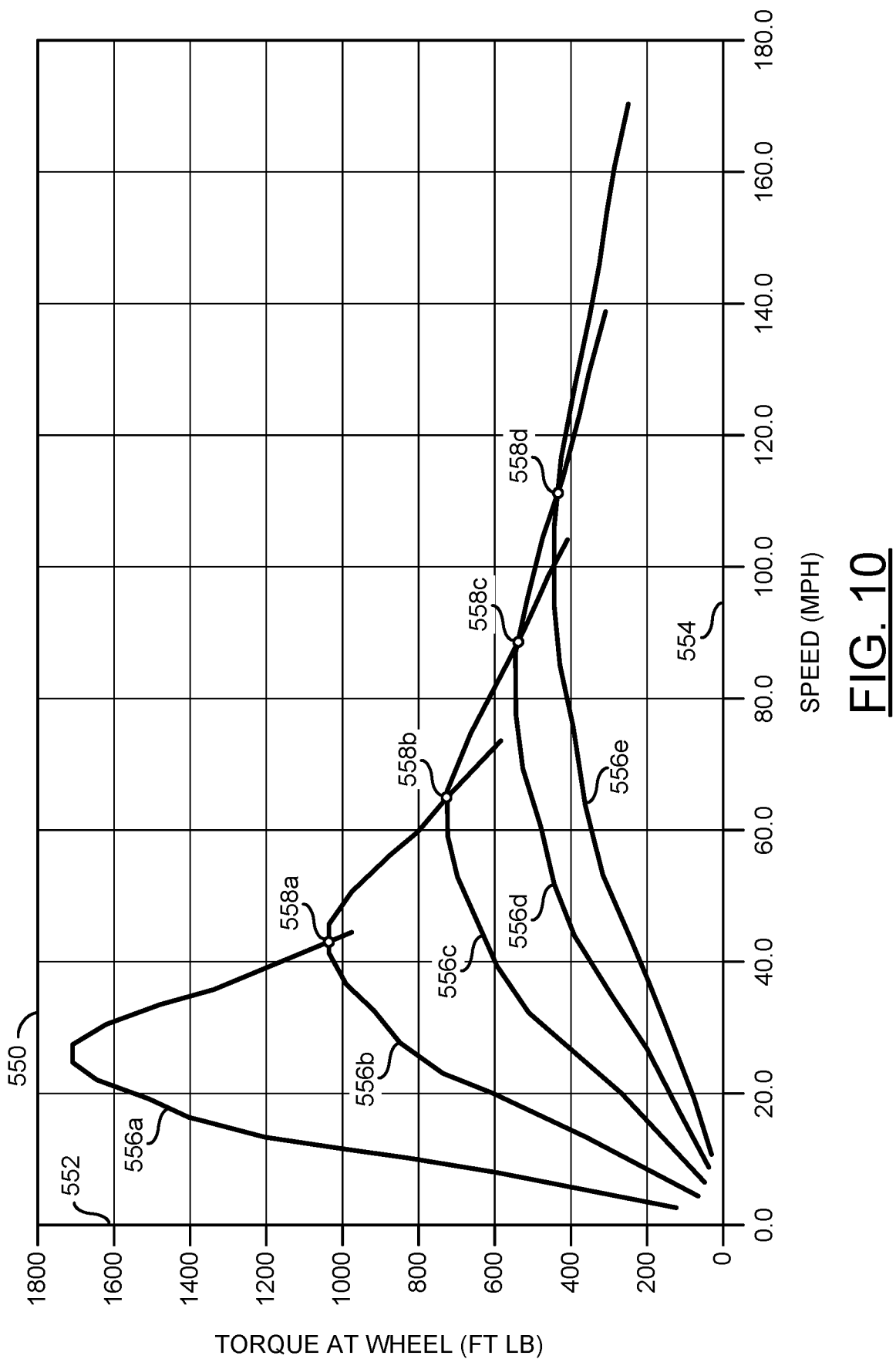
FIG. 10 is a diagram illustrating ideal gear selection based on a torque graph.

Referring to FIG. 10, a diagram illustrating ideal gear selection based on a torque graph is shown. A graph 550 is shown. The graph 550 may comprise a y-axis 552 and an x-axis 554. The y-axis 552 may comprise torque at the wheels 294a-294d measured in foot-pounds. The x-axis 554 may comprise a speed of the ego vehicle 50 in mph. The graph 550 may illustrate example optimal gear shift points for the motors 292a-292c based on pre-defined regions of a torque curve.

A number of lines 556a-556e are shown. The lines 556a-556e may illustrate the torque at the wheels 294a-294d as a function of the speed of the ego vehicle 50. Each of the lines 556a-556e may represent the torque as a function of speed for one of the gears of the motors 292a-292c. The line 556a may represent the first gear, the line 556b may represent the second gear, the line 556c may represent the third gear, the line 556d may represent the fourth gear and the line 556e may represent the fifth gear. Crossover points 558a-558d are shown. The crossover points 558a-558d may represent locations where the lines 556a-556e of a previous gear overlap the lines 556a-556e of a next gear. The crossover points 558a-558d may be the predefined regions of the torque curves for the motors 292a-292c.

The torque at the wheel line 556a for the first gear may be below 200 foot-pounds at a low speed and increase to over 1600 foot-pounds at approximately 30 mph. The line 556a for the first gear may drop to the crossover point 558a at approximately 42 mph. The torque at the wheel line 556b for the second gear may be below 200 foot-pounds at a low speed and increase to over 1000 foot-pounds at approximately 42 mph. For example, the line 556b may peak at the crossover point 558a. In the example shown, based on engine torque, the optimal region of the torque curve to shift from the first gear to the second gear may be 42 mph and at approximately 1000 foot-pounds.

The line 556*b* for the second gear may drop to the crossover point 558*b* at approximately 67 mph. The torque at the wheel line 556*c* for the third gear may be below 200 foot-pounds at a low speed and increase to approximately 700 foot-pounds at approximately 67 mph. For example, the line 556*c* may peak at the crossover point 558*b*. In the example shown, based on engine torque, the optimal time to shift from the second gear to the third gear may be 67 mph and at approximately 700 foot-pounds.

The line 556*c* for the third gear may drop to the crossover point 558*c* at approximately 90 mph. The torque at the wheel line 556*d* for the fourth gear may be below 200 foot-pounds at a low speed and increase to approximately 650 foot-pounds at approximately 90 mph. For example, the line 556*d* may peak at the crossover point 558*c*. In the example shown, based on engine torque, the optimal time to shift from the third gear to the fourth gear may be 90 mph and at approximately 650 foot-pounds.

The line 556*d* for the fourth gear may drop to the crossover point 558*d* at approximately 110 mph. The torque at the wheel line 556*e* for the fifth gear may be below 200 foot-pounds at a low speed and increase to approximately 420 foot-pounds at approximately 110 mph. For example, the line 556*e* may peak at the crossover point 558*d*. In the example shown, based on engine torque, the optimal time to shift from the fourth gear to the fifth gear may be 110 mph and at approximately 420 foot-pounds.

The speed and torque may be the drivetrain conditions that may be analyzed and/or predicted by the processors 106*a*-106*n*. For example, the decision module 158 may determine whether to enable and/or disable a gear shift based on whether the future torque predicted is within the predefined region of the torque curves 556*a*-556*e* (e.g., the crossover points 558*a*-558*d*). In one example, the future torque may be determined based on the predicted speed determined from the driving conditions extracted from the video frames. The decision module 158 may be configured to determine when to enable a gear shift in order to ensure that the gear shifts occur at the optimal torque values (e.g., the crossover points 558*a*-558*d*).

In the example shown, if the ego vehicle 50 is traveling in the first gear and the future predicted speed is greater than 42 mph, then the processors 106*a*-106*n* may enable the gear shift to the second gear based on the predetermined region of the torque curve. If the future predicted speed is less than 42 mph, then the processors 106*a*-106*n* may prevent the unnecessary gear shift. In another example, if the ego vehicle 50 is traveling in the second gear and the future predicted speed is greater than 67 mph, then the processors 106*a*-106*n* may enable the gear shift to the third gear based on the predetermined region of the torque curve. If the future predicted speed is less than 67 mph, then the processors 106*a*-106*n* may prevent the unnecessary gear shift. In yet another example, if the ego vehicle 50 is traveling in the third gear and the future predicted speed is greater than 90 mph, then the processors 106*a*-106*n* may enable the gear shift to the fourth gear based on the predetermined region of the torque curve. If the future predicted speed is less than 90 mph, then the processors 106*a*-106*n* may prevent the unnecessary gearshift. Instill another example, if the ego vehicle 50 is traveling in the fourth gear and the future predicted speed is greater than 110 mph, then the processors 106*a*-106*n* may enable the gear shift to the fifth gear based on the predetermined region of the torque curve. If the future predicted speed is less than 110 mph, then the processors 106*a*-106*n* may prevent the unnecessary gear shift.

While the examples provided may be suitable for a race car, similar decisions based on torque and/or RPM may be performed for other types of vehicles. The processors 106*a*-106*n* may use information similar to the RPM information in the graph 500 shown in association with FIG. 9 and/or the torque information in the graph 550 shown in association with FIG. 10 to determine criteria for shifting gears. As shown in the graph 500 and the graph 550, the criteria for determining to shift to another gear may be different depending on the current gear that the motors 292*a*-292*c* are using. Generally, the information from the graph 500, the graph 550 and/or other data used to determine which condition to shift gears may be stored in the look up table 170. In an example, the upper limits 508*a*-508*d* and/or the crossover points (e.g., predetermined region of the torque curve) 558*a*-558*d* may be used as the threshold conditions for comparing the future drivetrain configuration to the current drivetrain configuration. If the threshold condition is met, the signal VCTRL may be generated to enable the gear shift. If the threshold condition is not met, the signal VCTRL may be generated to prevent the gear shift.

Figure 11:
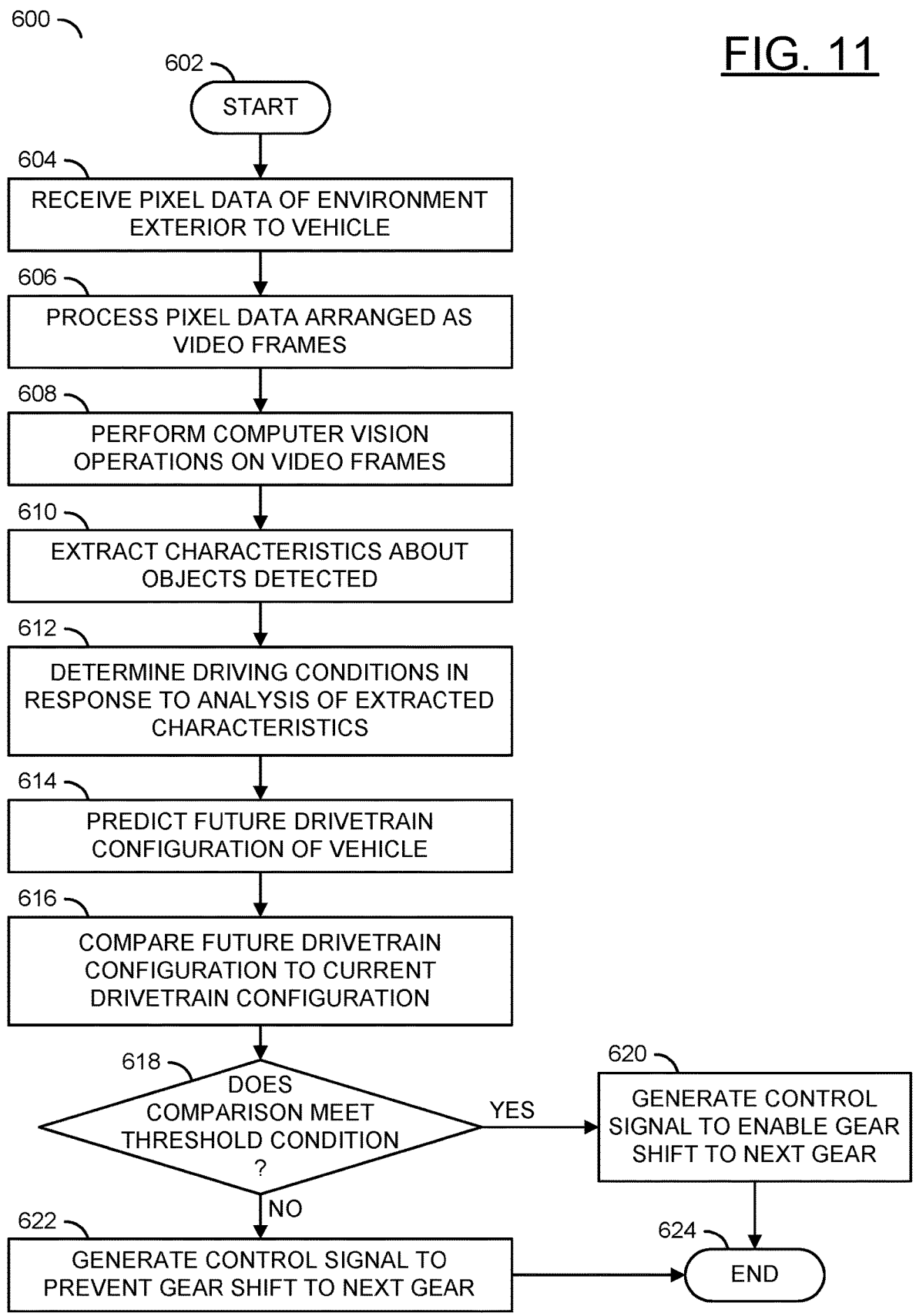
FIG. 11 is a flow diagram illustrating a method for implementing an efficient automatic gear shift using computer vision.

Referring to FIG. 11, a method (or process) 600 is shown. The method 600 may implement an efficient automatic gear shift using computer vision. The method 600 generally comprises a step (or state) 602, a step (or state) 604, a step (or state) 606, a step (or state) 608, a step (or state) 610, a step (or state) 612, a step (or state) 614, a step (or state) 616, a decision step (or state) 618, a step (or state) 620, a step (or state) 622, and a step (or state) 624.

The step 602 may start the method 600. In the step 604, the processors 106*a*-106*n* may receive pixel data. The pixel data received may be pixel data of the environment exterior to the ego vehicle 50 (e.g., the environment within the field of view 288). One or more of the capture devices 102*a*-102*n* may present the signals FRAMES_A-FRAMES_N to the processors 106*a*-106*n*. Next, in the step 606, the processors 106*a*-106*n* may process the pixel data arranged as video frames. For example, one or more of the dedicated hardware modules 180*a*-180*n* and/or the video processing pipeline 156 may generate video frames from the signals FRAMES_A-FRAMES_N. Next, the method 600 may move to the step 608.

In the step 608, the processors 106*a*-106*n* may perform computer vision operations on the video frames. In an example, the video processing pipeline 156 may present the video frames to the CNN module 150 as the video frames are generated to enable real-time computer vision operations. Next, in the step 610, the CNN module 150 may extract characteristics about the objects detected. In an example, the CNN module 150 may perform object detection and/or determine the characteristics of the objects detected. The object detection, along with classification and/or segmentation, may be part of the computer vision operations performed by the CNN module 150. The characteristics detected may comprise a distance, orientation, type and/or location of objects that may be used to determine the driving conditions. The driving conditions may affect the drivetrain configuration of the ego vehicle 50. Next, the method 600 may move to the step 612.

In the step 612, the CNN module 150 may be configured to determine driving conditions in response to an analysis of the extracted characteristics. For example, the CNN module 150 may associate an uneven terrain, dense traffic, intersections and/or other factors as being associated with driving conditions that may slow down the ego vehicle 50 and/or change the drivetrain configuration of the ego vehicle 50. Next, in the step 614, the decision module 158 may predict a future drivetrain configuration of the ego vehicle 50. In an example, the processors 106a-106n may be configured to predict a future speed of the ego vehicle 50, a future RPM of the motors 292a-292c, a future torque of the motors 292a-292c, etc. In the step 616, the processors 106a-106n may be configured to compare the predicted future drivetrain configuration to the current drivetrain configuration. For example, the current drivetrain configuration may be read from the sensors 114. Next, the method 600 may move to the decision step 618.

In the decision step 618, the decision module 158 may determine whether the comparison of the future drivetrain configuration with the current drivetrain configuration meets a threshold condition. In an example, the threshold condition may comprise an RPM as shown in association with FIG. 9. In another example, the threshold condition may comprise determining a torque curve as shown in association with FIG. 10. If the comparison meets the threshold condition (e.g., the threshold condition indicates a gear change should be performed), then the method 600 may move to the step 620. In the step 620, the processors 106a-106n may generate the signal VCTRL to enable a gearshift to the next gear. For example, the gear shift actuators 116a-116c may perform a gear shift in response to the signal VCTRL. Next, the method 600 may move to the step 620.

In the decision step 618, if the comparison does not meet the threshold condition (e.g., the threshold indicates that the ego vehicle 50 may slow down), then the method 600 may move to the step 622. In the step 622, the processors 106a-106n may generate the signal VCTRL to prevent a gear shift to the next gear (e.g., prevent an unnecessary gear shift). For example, the gear shift actuators 116a-116c may not perform a gear shift in response to the signal VCTRL (e.g., the signal VCTRL may not be communicated to enable a gear shift, or the signal VCTRL may stop a gear shift that would normally performed). Next, the method 600 may move to the step 624. The step 624 may end the method 600.

Figure 12:
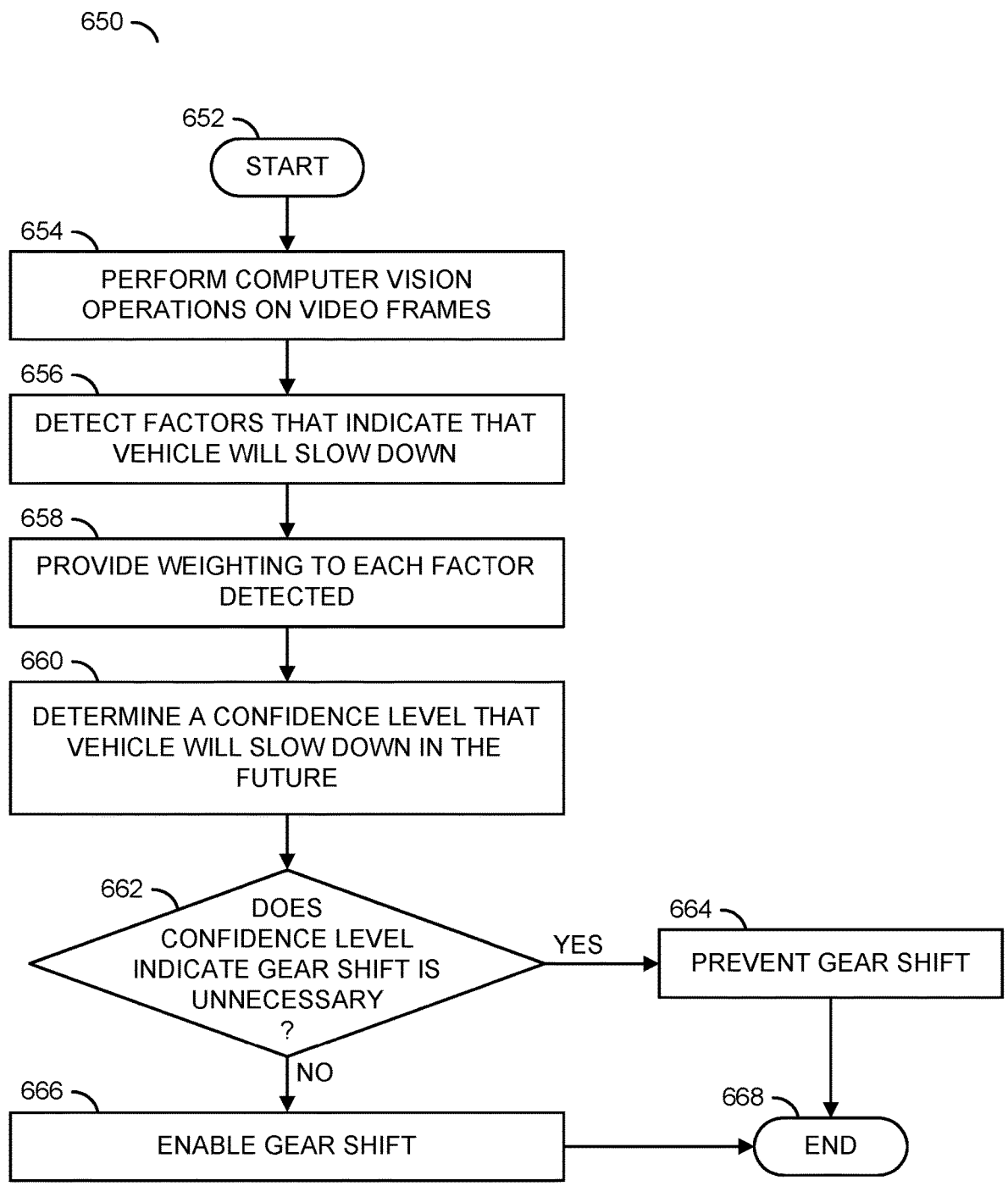
FIG. 12 is a flow diagram illustrating a method for determining a confidence level for whether a gear shift is unnecessary.

Referring to FIG. 12, a method (or process) 650 is shown. The method 650 may determine a confidence level for whether a gear shift is unnecessary. The method 650 generally comprises a step (or state) 652, a step (or state) 654, a step (or state) 656, a step (or state) 658, a step (or state) 660, a decision step (or state) 662, a step (or state) 664, a step (or state) 666, and a step (or state) 668.

The step 652 may start the method 650. In the step 654, the processors 106a-106n may perform the computer vision operations on the video frames (e.g., a sequence of video frames). Next, in the step 656, the processors 106a-106n may detect factors that may indicate that the ego vehicle 50 may slow down. The factors may be determined from the characteristics extracted from the video frames. In the step 658, the processors 106a-106n may provide a weighting to each factor detected. The factors, after weighting, may be used to determine the driving conditions. For example, the factors may be analyzed separately and together in order to determine the context of each factor within the environment near the ego vehicle 50. Weighting the factors may enable an analysis similar to a human viewing the environment (e.g., understanding an entire scene based on the context of the objects detected and understanding the relationships between the various objects detected). Next, the method 650 may move to the step 660.

In the step 660, the processors 106a-106n may determine a confidence level that the ego vehicle 50 may slow down in the future. The future may be an amount of time until the ego vehicle 50 reaches the various factors detected in the video frames. For example, if the computer vision detects the speed bump 290 one mile ahead and the ego vehicle 50 is driving 60 mph, the future may be the amount of time (e.g., approximately one minute) before the ego vehicle 50 would slow down due to the speed bump 290. The range of time used to determine whether the ego vehicle 50 may slow down may be dependent on the view distance of the capture devices 102a-102n and the relative speed of the objects detected with respect to the ego vehicle 50. Next, the method 650 may move to the decision step 662.

In the decision step 662, the processors 106a-106n may determine whether the confidence level of a likelihood of the ego vehicle 50 changing the drivetrain configuration (e.g., slowing down or speeding up, increasing/decreasing RPM, changing torque, etc.) indicates that a gear shift is unnecessary. If the confidence level indicates that the gear shift is unnecessary, then the method 650 may move to the step 664. In the step 664, the processors 106a-106n may generate the signal VCTRL to prevent the gear shift. Next, the method 650 may move to the step 668. In the decision step 662, if the confidence level indicates that the gear shift is not unnecessary, then the method 650 may move to the step 666. In the step 666, the processors 106a-106n may generate the signal VCTRL to enable the gearshift. Next, the method 650 may move to the step 668. The step 668 may end the method 650.

Figure 13:
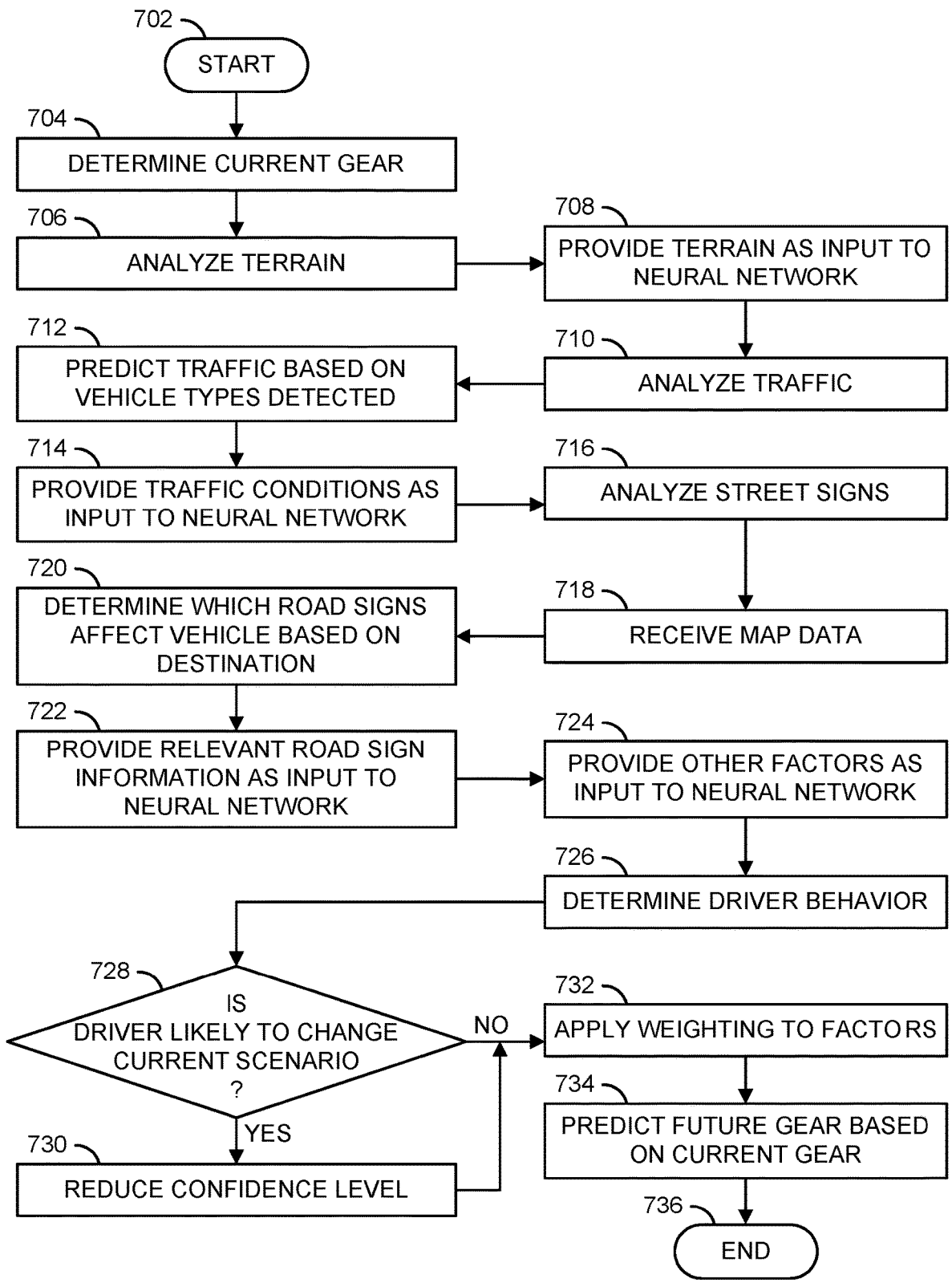
FIG. 13 is a flow diagram illustrating a method for detecting various factors from a video frame to provide as input to a neural network configured to predict a future gear.

Referring to FIG. 13, a method (or process) 700 is shown. The method 700 may detect various factors from a video frame to provide as input to a neural network configured to predict a future gear. The method 700 generally comprises a step (or state) 702, a step (or state) 704, a step (or state) 706, a step (or state) 708, a step (or state) 710, a step (or state) 712, a step (or state) 714, a step (or state) 716, a step (or state) 718, a step (or state) 720, a step (or state) 722, a step (or state) 724, a step (or state) 726, a decision step (or state) 728, a step (or state) 730, a step (or state) 732, a step (or state) 734, and a step (or state) 736.

The step 702 may start the method 700. In the step 704, the processors 106a-106n may read the sensors 114 to determine a current gear of the ego vehicle 50. Next, in the step 706, the CNN module 150 may analyze the terrain detected in the video frames. In the step 708, information about the terrain may be provided as input to the neural network models 256a-256n. Next, the method 700 may move to the step 710.

In the step 710, the CNN model 150 may analyze the traffic detected in the video frames. Next, in the step 712, the processors 106a-106n may predict the traffic based on the vehicle types detected and/or the characteristics of the vehicles detected (e.g., trucks and/or farm equipment may be slow moving vehicles, motorcycles may be fast moving vehicles, vehicle blinkers may indicate that a vehicle is changing lanes, which may impede the ego vehicle 50, etc.). In the step 714, information about the traffic conditions may be provided as input to the neural network models 256a-256n. Next, the method 700 may move to the step 716.

In the step 716, the CNN module 150 may analyze the street signs detected in the video frames. Next, in the step 718 the processors 106a-106n may receive map data. For example, the communication devices 110 may be configured to receive live traffic updates, navigation data (e.g., GPS/GNSS) and/or other map information from third-party services. In the step 720, the decision module 158 may determine which road signs affect the ego vehicle 50 based on the destination of the ego vehicle 50 (e.g., a speed limit sign may not be relevant if the ego vehicle 50 is turning onto another road). For example, the navigation data may be used to determine where the ego vehicle 50 is going in order to determine which driving conditions detected are relevant. Next, in the step 722, the information about the relevant road signs may be provided as input to the neural network models 256a-256n. Next, the method 700 may move to the step 724.

In the step 724, other factors detected in the video frames may be provided as input to the neural network models 256a-256n. In the step 726, the processors 106a-106n may determine a behavior of the driver 202. In an example, a driver history may be stored that may indicate how likely the driver 202 will follow the rules of the road, how aggressively the driver 202 drives (e.g., likely to pass slow vehicles or remain behind a slow vehicle), etc. Next, the method 700 may move to the decision step 728.

In the decision step 728, the decision module 158 may determine whether the driver 202 is likely to change the current scenario. In an example, an aggressive driver may change a driving scenario by passing a slow moving vehicle. In another example, a careful driver may slow down to leave extra space if a vehicle changes lanes in front of the ego vehicle 50. While analysis of the video frames may provide information about where various objects currently are, the detected objects may also move independently of the position of the ego vehicle 50. If the driver 202 is likely to change the current scenario, then the method 700 may move to the step 730. In the step 730, the neural network models 256a-256n may reduce a confidence level of the various factors detected. Next, the method 700 may move to the step 732.

In the decision step 728, if the driver 202 is unlikely to change the current scenario, then the method 700 may move to the step 732. In the step 732, the neural network models 256a-256n may apply weighting to the factors detected. Next, in the step 734, the neural network models 256a-256n may predict a future gear based on the current gear. For example, since the drivetrain configuration for changing a gear may be different for each gear, the decision about whether to change gears may depend upon the current gear. The neural network models 256a-256n may be configured to provide an output based on the results of the computer vision operations. The output may be a decision about whether to change a gear or not change a gear. The decision about whether to change a gear or not change a gear may be determined without first predicting the speed of the ego vehicle 50. Next, the method 700 may move to the step 736. The step 736 may end the method 700.

In some embodiments, the processors 106a-106n may be configured to implement the neural network models 256a-256n to determine the drivetrain configuration based on the driving conditions detected. While the graph 500 shown in association with FIG. 9 shows the RPM for changing gears with respect to a speed of the ego vehicle 50 and the graph 550 shown in association with FIG. 10 shows the torque for changing gears with respect to a speed of the ego vehicle 50, the neural network models 256a-256n may be configured to determine when a gear change is appropriate or unnecessary without predicting a future speed. For example, the training data 252a-252n may be labeled with future drivetrain configuration information (e.g., RPM, position of a torque curve, etc.) without regard to speed. The computer vision operations may determine the driving conditions and the driving conditions may be used to directly determine the future RPM and/or torque. Based on the RPM, torque and/or other drivetrain conditions and the current gear, the processors 106a-106n may be configured to determine whether a gear change may be appropriate or unnecessary. The RPM and/or torque may be used as a threshold condition for determining the gear shift. The threshold condition may vary based on the current gear.

Figure 14:
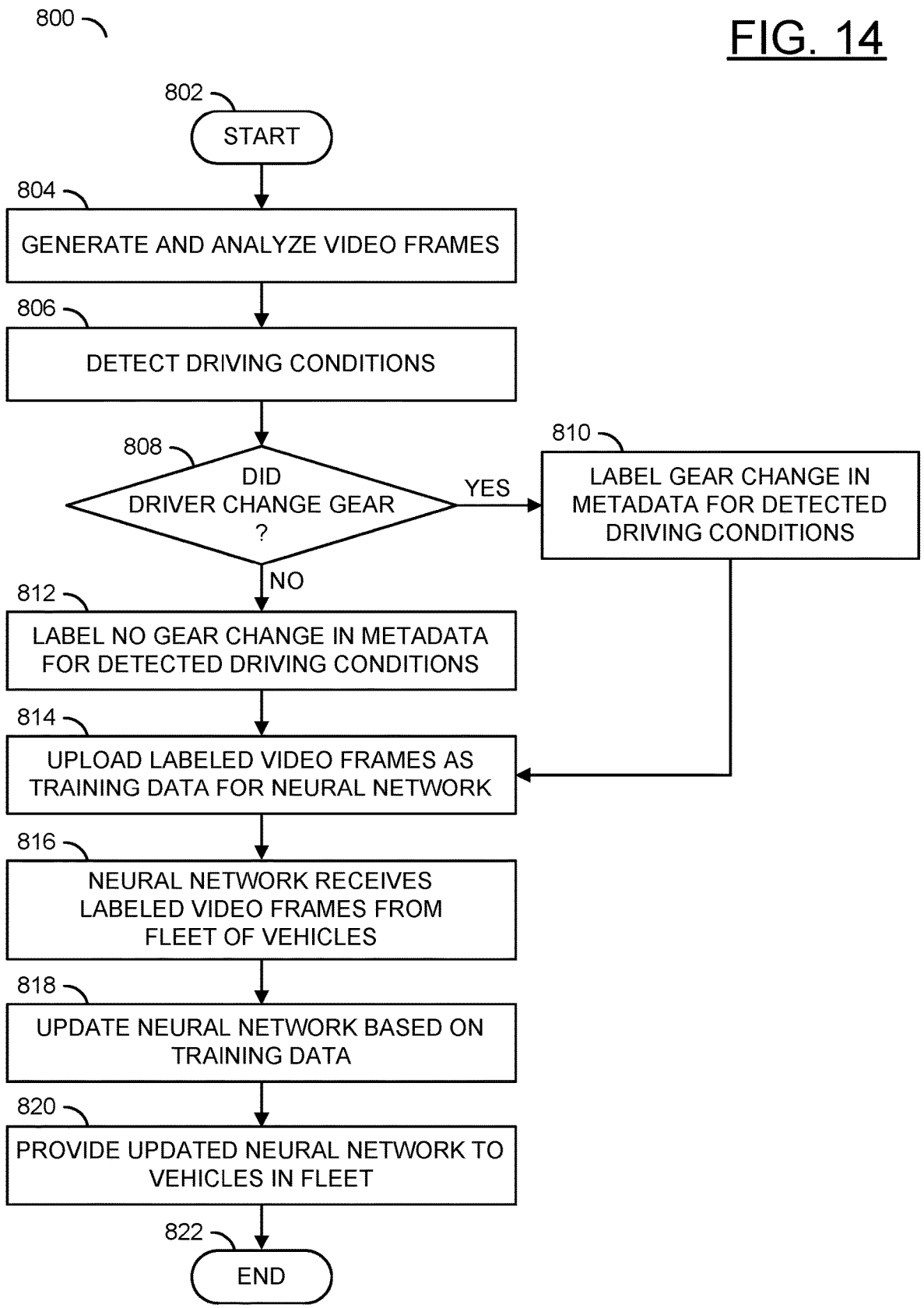
FIG. 14 is a flow diagram illustrating a method for providing labeled video frames to enable fleet learning to train a neural network.

Referring to FIG. 14, a method (or process) 800 is shown. The method 800 may provide labeled video frames to enable fleet learning to train a neural network. The method 800 generally comprises a step (or state) 802, a step (or state) 804, a step (or state) 806, a decision step (or state) 808, a step (or state) 810, a step (or state) 812, a step (or state) 814, a step (or state) 816, a step (or state) 818, a step (or state) 820, and a step (or state) 822.

The step 802 may start the method 800. In the step 804, the processors 106a-106n may generate and analyze the video frames. Next, in the step 804, the processors 106a-106n may detect the driving conditions by analyzing the various objects detected. Next, the method 800 may move to the decision step 808.

In the decision step 808, the processors 106a-106n may determine whether the ego vehicle 50 changed gears. For example, the processors 106a-106n may determine the driving conditions of the environment near the ego vehicle 50 and then determine whether a gear change was actually performed when the ego vehicle 50 reached the detected driving conditions. If the gear change was performed, then the method 800 may move to the step 810. In the step 810, the processors 106a-106n may label the metadata associated with the video frames that were used to detect the driving conditions with a 'gear change' label (or a label providing the actual drivetrain conditions) corresponding to when the upcoming location shown in the video frame has eventually been reached. Next, the method 800 may move to the step 814. In the decision step 808, if the gear change was not performed, then the method 800 may move to the step 812. In the step 812, the processors 106a-106n may label the metadata associated with the video frames that were used to detect the driving conditions with a 'no gear change' label (or a label providing the actual drivetrain conditions) corresponding to when the upcoming location shown in the video frame has eventually been reached. For example, the metadata may comprise metadata that corresponds to the objects detected at the time the video frame was captured and the metadata that corresponds to the drivetrain conditions detected at a later time when the ego vehicle 50 has reached the location of the detected objects. Next, the method 800 may move to the step 814.

In the step 814, the communications module 110 may upload the labeled video frames to the centralized convolutional neural network 254. The labeled video frames may be used as training data. Next, in the step 816, the centralized convolutional neural network 254 may receive labeled video frames from a fleet of vehicles (e.g., multiple vehicles that each implement the apparatus 100). The fleet of vehicles may provide a large dataset of the training data 252a-252n. Next, the method 800 may move to the step 818.

In the step 818, the centralized convolutional neural network 254 may update one or more of the neural network models 256a-256n based on the training data 252a-252n. For example, the neural network models 256a-256n may be updated to better predict whether or not a gear change may occur based on the driving conditions by having access to the massive data set of training data provided by the fleet of vehicles each implementing the apparatus 100. Next, in the step 820, the centralized convolutional neural network 254 may provide an update of the neural network models 256a-256n to vehicles in the fleet. The neural network models 256a-256n implemented by the centralized convolutional neural network 254 may provide a source for the neural network models 256a-256n implemented by the CNN module 150. For example, the communication device 110 may receive an updated version of the neural network models 256a-256n that may be used by the CNN module 150. Next, the method 800 may move to the step 822. The step 822 may end the method 800.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data of an exterior environment of a vehicle; and
a processor configured to (i) process said pixel data arranged as video frames, (ii) perform computer vision operations to detect objects in said video frames, (iii) extract characteristics about said objects detected, (iv) determine driving conditions in response to an analysis of said characteristics and (v) generate a control signal, wherein
(a) said control signal is configured to perform a gear shift,
(b) said driving conditions are used to predict a future drivetrain configuration of said vehicle,
(c) said gear shift is performed if a comparison of said future drivetrain configuration with a current drivetrain configuration of said vehicle meets a threshold condition, and
(d) said gear shift is not performed if said comparison does not meet said threshold condition.

2. The apparatus according to claim 1, wherein said processor is further configured to (i) determine whether said gear shift is unnecessary and (ii) prevent performing said gear shift when said gear shift is determined to be unnecessary.

3. The apparatus according to claim 2, wherein preventing said gear shift determined to be unnecessary increases an efficiency of said vehicle by avoiding a power interruption caused by a shift time of said gear shift.

4. The apparatus according to claim 1, wherein said future drivetrain configuration comprises a future speed of said vehicle and said current drivetrain configuration comprises a current speed of said vehicle.

5. The apparatus according to claim 1, wherein said future drivetrain configuration comprises a future RPM of a motor and said current drivetrain configuration comprises a current RPM of said motor.

6. The apparatus according to claim 1, wherein said future drivetrain configuration comprises a future region of a torque curve and said current drivetrain configuration comprises a current region of said torque curve.

7. The apparatus according to claim 1, wherein said current drivetrain configuration is determined in response to reading sensors of said vehicle.

8. The apparatus according to claim 1, wherein said driving conditions comprise a plurality of factors that indicate that said vehicle will slow down from a current speed of said vehicle.

9. The apparatus according to claim 8, wherein said processor is further configured to analyze and provide a weighting to each of said factors detected to determine a confidence level that said vehicle will slow down from said current speed of said vehicle.

10. The apparatus according to claim 8, wherein said factors comprise a type of detected vehicle, whether said detected vehicle is in a same lane as said vehicle, whether said detected vehicle is likely to change move in front of said vehicle, a speed of said detected vehicle, whether an alternate lane is available and driving habits of a driver of said vehicle.

11. The apparatus according to claim 1, wherein said driving conditions are determined in response to (i) detecting a road sign and (ii) determining a vehicle reaction in response to said road sign.

12. The apparatus according to claim 11, wherein (i) said road sign is a stop sign, (ii) said vehicle reaction to said stop sign is to slow down and (iii) said comparison of said future drivetrain configuration to said current drivetrain configuration does not meet said threshold condition.

13. The apparatus according to claim 11, wherein (i) said road sign is a speed limit that is less than a current speed of said vehicle, (ii) said vehicle reaction to said speed limit is to slow down and (iii) said comparison of said future drivetrain configuration to said current drivetrain configuration does not meet said threshold condition.

14. The apparatus according to claim 1, wherein said driving conditions comprise at least one of a road incline, a road curve and difficult terrain.

15. The apparatus according to claim 14, wherein said difficult terrain comprises at least one of mud, snow, sand and crushed stone.

16. The apparatus according to claim 1, wherein (i) said processor is configured to implement a neural network model, (ii) said driving conditions are provided as input to said neural network model and (iii) said neural network model is configured to determine whether said gear shift is unnecessary in response to said input.

17. The apparatus according to claim 16, wherein (i) said neural network model is configured to receive updates from a neural network model source, (ii) said neural network source model is configured to update said neural network model in response to fleet learning and (iii) said fleet learning comprises a plurality of vehicles implementing said processor uploading said driving conditions with a corresponding labeled drivetrain configuration performed in response to said driving conditions to said neural network source model as training data.

18. The apparatus according to claim 1, wherein (i) said driving conditions are further determined in response to receiving at least one of map data and live traffic data from an external source and (ii) said processor is configured to perform sensor fusion to combine information from one or more of said map data, said live traffic data and said analysis of said characteristics about said objects in order to determine said future drivetrain configuration.

19. The apparatus according to claim 1, wherein said apparatus is configured to implement efficient automatic gear shift using computer vision.

* * * * *